(12) United States Patent
Lindinger et al.

(10) Patent No.: US 11,969,661 B2
(45) Date of Patent: Apr. 30, 2024

(54) TUNNEL FOR MOUNTING ABOVE A ROAD SURFACE

(71) Applicants: BRP-ROTAX GMBH & CO. KG, Gunskirchen (AT); ARS ELECTRONICA LINZ GMBH & CO. KG, Linz (AT)

(72) Inventors: Christopher Lindinger, Linz (AT); Manuel Adam, Steinhaus bei Wels (AT)

(73) Assignees: BRP-ROTAX GMBH & CO. KG, Gunskirchen (AT); ARS ELECTRONICA LINZ GMBH & CO. KG, Linz (AT)

( * ) Notice: Subject to any disclaimer, the term of this patent is extended or adjusted under 35 U.S.C. 154(b) by 299 days.

(21) Appl. No.: 17/621,892

(22) PCT Filed: Jun. 24, 2020

(86) PCT No.: PCT/EP2020/067604
§ 371 (c)(1),
(2) Date: Dec. 22, 2021

(87) PCT Pub. No.: WO2020/260343
PCT Pub. Date: Dec. 30, 2020

(65) Prior Publication Data
US 2022/0249965 A1     Aug. 11, 2022

(30) Foreign Application Priority Data
Jun. 24, 2019   (AT) .............................. A 50559/2019

(51) Int. Cl.
*A63G 33/00*     (2006.01)
*E04H 3/22*      (2006.01)
(Continued)

(52) U.S. Cl.
CPC ............... *A63G 33/00* (2013.01); *E04H 3/22* (2013.01); *G01S 5/02213* (2020.05);
(Continued)

(58) Field of Classification Search
CPC ....... A63G 31/16; A63G 33/00; A63F 13/803; A63F 13/837; G01S 5/02213; G01S 17/42; E04H 3/22
(Continued)

(56) References Cited

U.S. PATENT DOCUMENTS 5,253,049 A * 10/1993 Brooke ................... A63F 13/90
                                                348/E5.145
8,727,896 B2 * 5/2014 Frolov ..................... A63G 1/02
                                                472/60
(Continued)

FOREIGN PATENT DOCUMENTS

| CH | 411018 A | 4/1966 |
|---|---|---|
| CN | 106874571 B | 5/2018 |

(Continued)

OTHER PUBLICATIONS

BattleKart: "BattleKart—TF1 Newscast (Mar. 26, 2016)", Youtube, Aug. 23, 2016 (Aug. 23, 2016), p. 1, received from the ISA/EP as part of the Search Report of the application No. PCT/EP2020/067596 and retrieved from the Internet: URL:https://www.youtube.com/watch?time_continue=2&v= 4kkmslu0Yg on Dec. 12, 2018.
(Continued)

*Primary Examiner* — Kien T Nguyen
(74) *Attorney, Agent, or Firm* — BCF LLP

(57) ABSTRACT

A tunnel for mounting above a road surface (3) comprises a plurality of tunnel segments (1). Each tunnel segment is adapted for mounting at least one projector (6) therein, above a respective opening formed by the tunnel segment in a ceiling of the tunnel. The openings (5) of the plurality of (Continued)

tunnel segments are spaced apart in succession in a direction of travel of vehicles in the tunnel. The tunnel segments are disposed such that projection surfaces (8) of the projectors are seamlessly contiguous or overlapping on the road surface in the direction of travel. The tunnel may comprise awnings positioned at its entrance and its exit, the ceiling being formed at least in part by the awnings. A first awning (10A) may be mounted to a first tunnel segment, in the direction of travel, and a second awning (10B) may be mounted to a last tunnel segment, in the direction of travel.

15 Claims, 10 Drawing Sheets

(51) Int. Cl.
  *G01S 5/02*     (2010.01)
  *G01S 17/42*    (2006.01)
  *A63G 25/00*    (2006.01)
  *A63K 1/00*     (2006.01)

(52) U.S. Cl.
  CPC .............. *G01S 17/42* (2013.01); *A63G 25/00* (2013.01); *A63K 1/00* (2013.01)

(58) Field of Classification Search
  USPC ............................................ 472/43, 60, 128
  See application file for complete search history.

(56) References Cited

U.S. PATENT DOCUMENTS

| | | | |
|---|---|---|---|
| 10,099,149 B2 * | 10/2018 | Boyle | .................... A63G 21/04 |
| 2018/0023961 A1 | 1/2018 | Fridman | |
| 2018/0169530 A1 | 6/2018 | Millecam et al. | |

FOREIGN PATENT DOCUMENTS

| | | |
|---|---|---|
| DE | 20004174 U1 | 7/2001 |
| DE | 102016225886 A1 | 6/2018 |
| WO | 2004042666 A2 | 5/2004 |
| WO | 2019084583 A1 | 5/2019 |

OTHER PUBLICATIONS

Gunaratne, A Comparative Analysis of Low Cost Localization Methods for a Mario Kart Game Application, a Thesis presented to California Polytechnic State University, San Luis Obispo, Aug. 2012.

International Search Report of PCT/EP2020/067596, ISA/EP, Alessandra Pandolfi, dated Feb. 2, 2021.

FIA Formula E, Fanboost, retrieved from https://www.fiaformulae.com/en/championship/fanboost on Jun. 19, 2020.

FIA Formula E, Attack Mode, retrieved from https://www.fiaformulae.com/en/championship/attack-mode on Jun. 19, 2020.

International Search Report of PCT/EP2020/067604, ISA/EP, Kalle Maukonen, dated Oct. 27, 2020.

* cited by examiner

TUNNEL FOR MOUNTING ABOVE A ROAD SURFACE

CROSS-REFERENCE

The present application claims priority to Austrian patent application no. A50559/2019, filed on Jun. 24, 2019, the entirety of which is incorporated herein by reference.

FIELD OF TECHNOLOGY

The present technology relates to a tunnel for mounting above a road surface.

BACKGROUND

Racing on a track, for example when driving go karts, can be fun. The driver experience may be improved via the creation of simulated environments on a track, for example a racetrack.

For example, US20180169530A1 describes a system for creating an environment. The system includes a server, at least one mobile element, a projection system that includes a plurality of projectors capable of projecting partial images which form an overall image, and a locating system that includes a plurality of sensors capable of detecting whether the mobile element is within its capture cone. The server determines, as a function of the information that it receives from the mobile element and from the locating system, information to be sent to the mobile element and to the projection system, so as to modify the environment perceived by a pilot of the mobile element and of potential spectators.

In another example, WO2019084583A1 describes a system for optical representation of information for person in a vehicle such as kart. The system includes a reproduction unit and a control unit arranged to reproduce individualized information by utilizing reproduction units on a track forming a closed circuit Some disadvantages of these technologies include their complexity and cost, as they may require positioning a large number of cameras and position determining equipment along racetracks and require high bandwidth communication between the racetracks and vehicles. Other disadvantages include the fact that they may only be reasonably applicable in dark environments. Further disadvantages may include the lack of immersive experience provided by systems that provide limited projection visibility.

In view of the foregoing, there is a need for solutions that ameliorate over the disadvantages of conventional simulated environments.

SUMMARY

It is an object of the present technology to ameliorate at least some of the inconveniences present in the prior art.

The present disclosure introduces a tunnel for positioning above the road surface of a track for human-driven vehicles, for example a racetrack, the tunnel supporting projectors for displaying virtual elements while mitigating or avoiding the disadvantages of earlier solutions.

To overcome the problems related to complexity and cost of earlier solutions, the present technology creates a tunnel for mounting above a road surface. The tunnel may be formed by assembling a small number of elements, such as tunnel segments and, optionally, transition pieces connecting the tunnel segments and awnings positioned at an entrance and at an exit of the tunnel. Projectors may be mounted in the tunnel segments for projecting images, for example virtual elements. Positioning systems may be integrated in the tunnel, allowing to detect positions of vehicles in the tunnel in order to optionally modify the virtual elements.

According to one aspect of the present technology, there is provided a tunnel for mounting above a road surface, comprising:
a plurality of tunnel segments, each tunnel segment being adapted for mounting at least one projector therein;
wherein:
each tunnel segment is adapted for mounting the at least one projector above a respective opening formed by the tunnel segment in a ceiling of the tunnel, the openings of the plurality of tunnel segments being spaced apart in succession in a direction of travel of vehicles in the tunnel; and
the tunnel segments are disposed such that projection surfaces of the projectors are seamlessly contiguous or overlapping on the road surface in the direction of travel.

In some embodiments of the present technology, each tunnel segment further comprises a roof adjacent to the opening in the ceiling of the tunnel; and the tunnel segments are adapted for mounting the projectors in upper areas of the roofs.

In some embodiments of the present technology, the tunnel further comprises at least one transition piece; wherein: one transition piece of the at least one transition piece is disposed between each pair of adjacent tunnel segments; the roofs of the tunnel segments are connected by interposing the transition pieces therebetween; and the ceiling of the tunnel is formed at least in part by the transition pieces.

In some embodiments of the present technology, each tunnel segment comprises a roof; the opening of each tunnel segment is formed at a lower end of the roof; and the tunnel segments are adapted for mounting the projectors above the openings at a vertical distance of at least 0.5 meter from the lower end of the roof.

In some embodiments of the present technology, the tunnel segments are adapted for mounting the projectors above the openings at a vertical distance of at least one meter from the lower end of the roof.

In some embodiments of the present technology, the tunnel further comprises at least one transition piece; wherein: each tunnel segment comprises a roof terminating at its lower end on a pair of vertical side walls disposed on opposite sides of the road surface; for each pair of adjacent tunnel segments, on each side of the road surface, a corresponding side of one transition piece of the at least one transition piece being disposed between the pair of adjacent tunnel segments connects one side wall of one of the adjacent tunnel segments to one side wall of another one of the adjacent tunnel segments; the at least one transition piece forms part of the ceiling of the tunnel; and the roofs of the tunnel segments protrude above the ceiling of the tunnel.

In some embodiments of the present technology, the plurality of tunnel segments comprises a plurality of identical tunnel segments having rectangular layouts; and the identical tunnel segments comprise identical roofs, each identical roof being adapted for mounting at least one projector therein.

In some embodiments of the present technology, the tunnel further comprises one or more transition pieces, one transition piece connecting each pair of adjacent tunnel segments, the one or more transition pieces being adapted for compensating for various slopes or angles between the pairs of adjacent tunnel segments.

In some embodiments of the present technology, an entrance of the tunnel is at a first level and an exit of the tunnel is at a second level higher than the first level, whereby the tunnel matches an upward slope on the road surface beneath the tunnel.

In some embodiments of the present technology, the tunnel further comprises a first position detection system disposed in the tunnel, the first position detection system comprising three first receivers adapted for receiving a signal from a transmitter mounted on a vehicle passing in the tunnel, the first position detection system being adapted for deriving a first position data for the vehicle in the tunnel based on the signal received at the three first receivers.

In some embodiments of the present technology, the tunnel further comprises a second position detection system comprising a transmitter and a second receiver, the transmitter being adapted for transmitting an optical signal toward the vehicle, the second receiver being adapted for receiving a reflection of the optical signal reflected by the vehicle, the second position system being further adapted for deriving second position data for the vehicle, the second position data comprising a distance between the vehicle and the transmitter and/or a distance between the vehicle and the second receiver, the second position data being derived by time-of-flight measurement of the optical signal and of the reflected optical signal.

In some embodiments of the present technology, the tunnel further comprises a first awning positioned at an entrance of the tunnel; and a second awning positioned at an exit of the tunnel; wherein: the ceiling is formed at least in part by the first and second awnings; the first awning is mounted to a first tunnel segment, in the direction of travel, of the plurality of tunnel segments; and the second awning is mounted to a last tunnel segment, in the direction of travel, of the plurality of tunnel segments.

According to another aspect of the present technology, there is provided a tunnel for mounting above a road surface, comprising:

a plurality of tunnel segments; and a plurality of projectors, at least one projector of the plurality of projectors being mounted in each of the tunnel segments above a respective opening formed by each tunnel segment in a ceiling of the tunnel, the openings being spaced apart in succession in a direction of travel of vehicles in the tunnel;

wherein the tunnel segments are disposed so that projection surfaces of the projectors are seamlessly contiguous or overlapping on the road surface in the direction of travel.

In some embodiments of the present technology, each tunnel segment further comprises a roof adjacent to the openings in the ceiling of the tunnel; and the segments are adapted for mounting the projectors in upper areas of the roofs.

In some embodiments of the present technology, the tunnel further comprises one or more transition pieces; wherein: one transition piece is disposed between each pair of adjacent tunnel segments; the roofs of the tunnel segments are connected by interposing the transition pieces therebetween; and the ceiling of the tunnel is formed at least in part by the transition pieces.

In some embodiments of the present technology, each tunnel segment comprises a roof; the opening of each tunnel segment is formed at a lower end of the roof; and the tunnel segments are adapted for mounting the projectors above the openings at a vertical distance of at least 0.5 meter from the lower end of the roof.

In some embodiments of the present technology, the tunnel segments are adapted for mounting the projectors above the openings at a vertical distance of at least one meter, from the lower end of the roof.

In some embodiments of the present technology, the tunnel further comprises at least one transition piece; wherein: each tunnel segment comprises a roof terminating at its lower end on a pair of vertical side walls disposed on opposite sides of the road surface; for each pair of adjacent tunnel segments, on each side of the road surface, a corresponding side of one transition piece of the at least one transition piece being disposed between the pair of adjacent tunnel segments connects one side wall of one of the adjacent tunnel segments to one side wall of another one of the adjacent tunnel segments; the at least one transition piece forms part of the ceiling of the tunnel; and the roofs of the tunnel segments protrude above the ceiling of the tunnel.

In some embodiments of the present technology, the plurality of tunnel segments comprises a plurality of identical tunnel segments having rectangular layouts; and the identical tunnel segments comprise identical roofs, each identical roof being adapted for mounting at least one projector therein.

In some embodiments of the present technology, the tunnel further comprises one or more transition pieces, one transition piece connecting each pair of adjacent tunnel segments, the one or more transition pieces being adapted for compensating for various slopes or angles between the pairs of adjacent tunnel segments.

In some embodiments of the present technology, an entrance of the tunnel is at a first level and an exit of the tunnel is at a second level higher than the first level, whereby the tunnel matches an upward slope on the road surface beneath the tunnel.

In some embodiments of the present technology, the tunnel further comprises a first position detection system disposed in the tunnel, the first position detection system comprising three first receivers adapted for receiving a signal of a transmitter mounted on a vehicle passing in the tunnel, the first position detection system being adapted for deriving a first position data for the vehicle in the tunnel based on the signal received at the three first receivers.

In some embodiments of the present technology, the tunnel further comprises a second position detection system comprising a transmitter and a second receiver, the transmitter being adapted for transmitting an optical signal toward the vehicle, the second receiver being adapted for receiving a reflection of the optical signal reflected by the vehicle, the second position system being further adapted for deriving second position data for the vehicle, the second position data comprising a distance between the vehicle and the transmitter and/or a distance between the vehicle and the second receiver, the second position data being derived by time-of-flight measurement of the optical signal and of the reflected optical signal.

In some embodiments of the present technology, the tunnel further comprises a first awning positioned at a start of the tunnel; and a second awning positioned at an end of the tunnel; wherein: the ceiling is formed at least in part by the first and second awnings; the first awning is mounted to a first one, in the direction of travel, of the plurality of tunnel segments; and the second awning is mounted to a last one, in the direction of travel, of the plurality of tunnel segments.

In some embodiments of the present technology, the projection surface of at least one of the projectors extends onto a portion of the road surface of the track located beneath the first awning; and the projection surface of at least another one of the projectors extends onto a portion of the road surface of the track located beneath the second awning According to a further aspect of the present technology, there is provided a tunnel for mounting above a road surface, comprising:

a plurality of tunnel segments;

a plurality of projectors, at least one projector of the plurality of projectors being mounted in each of the tunnel segments, the projectors being adapted for displaying at least one virtual element onto the road surface within the tunnel, wherein projection surfaces of successive projectors are seamlessly contiguous or at least partially overlap on the road surface within the tunnel;

a first position detection system disposed in the tunnel, the first position detection system comprising three first receivers adapted for receiving a signal from a transmitter mounted on a vehicle passing in the tunnel, the first position detection system being adapted for deriving first position data for the vehicle in the tunnel based on the signal received at the at least three first receivers; and a second position detection system comprising a transmitter and a second receiver, the transmitter being adapted for transmitting an optical signal toward the vehicle, the second receiver being adapted for receiving a reflection of the optical signal reflected by the vehicle, the second position system being further adapted for deriving second position data for the vehicle, the second position data comprising a distance between the vehicle and the transmitter and/or a distance between the vehicle and the second receiver, the second position data being derived by time-of-flight measurement of the optical signal and of the reflected optical signal; and a central controller being in communication with the first and second position detection systems, the central controller being adapted for receiving the first and second position data for the vehicle from the first and second position detection systems and to alter at least one of a position and an appearance of the at least one virtual element displayed onto the road surface based on the first and second position data for the vehicle.

In some embodiments of the present technology, each projector is mounted in a respective tunnel segments above a respective opening formed by the respective tunnel segment in a ceiling of the tunnel, the openings of successive tunnel segments being spaced apart in succession in a direction of travel of vehicles in the tunnel Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the various drawings are not to scale.

DETAILED DESCRIPTION

The present technology will be described with respect to a racetrack. However, it is contemplated that the present technology could be applied to other track types. Application of the present technology is therefore not intended to be limited to its use in racetracks or in high speed driving applications. Additionally, while an intended use of the present technology is to human-driven vehicles on solid surfaces, the present technology may also be used for other applications that benefit from the present interactive system.

Figure 1B:
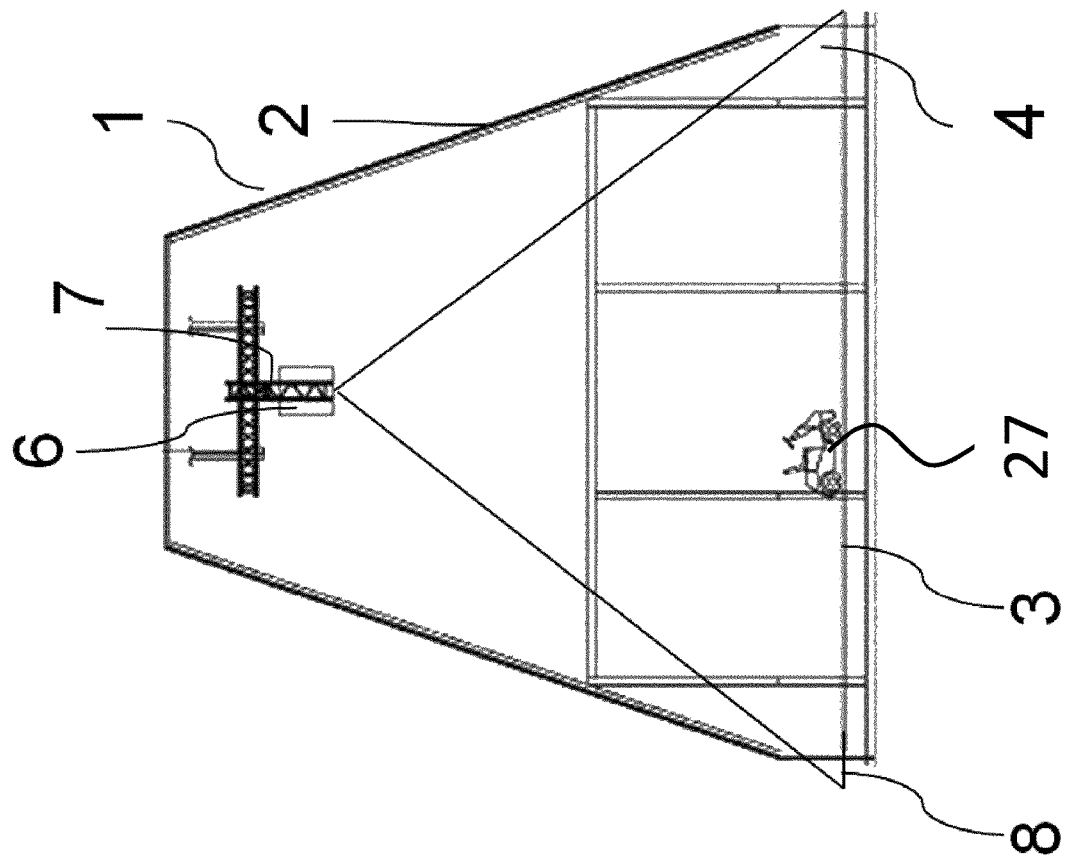
FIG. 1B is a sectional side view of the tunnel of FIG. 1A.
Figure 1A:
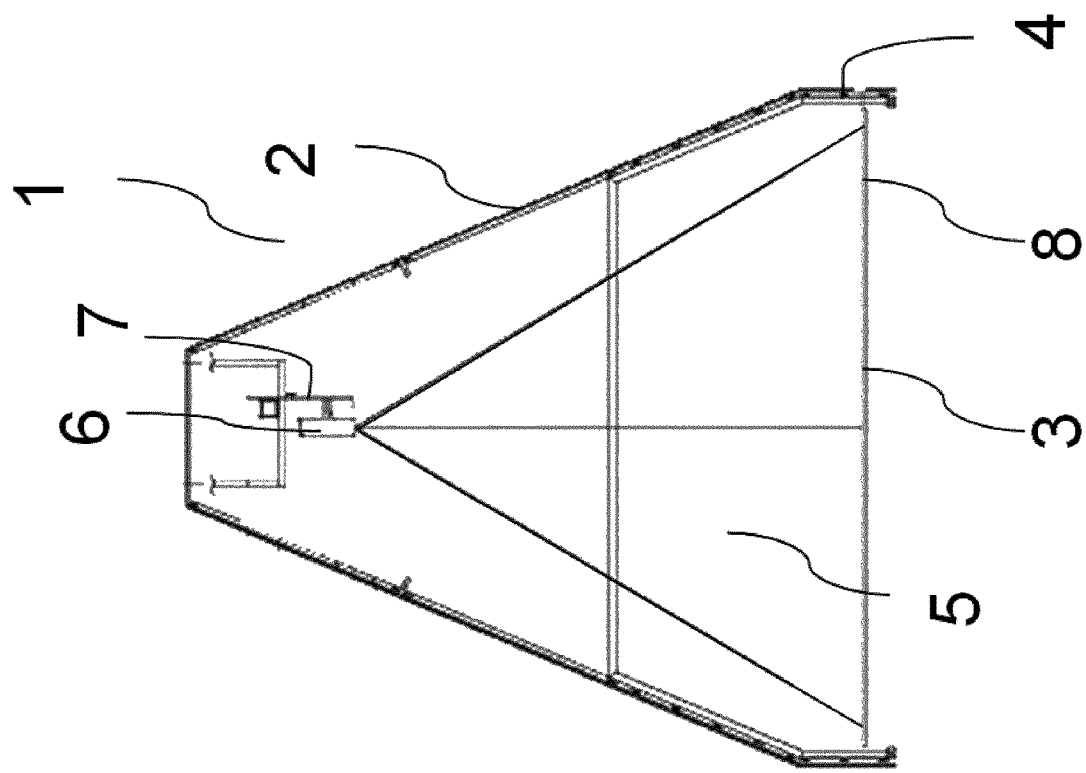
FIG. 1A is a sectional front view of a tunnel element in accordance with an embodiment of the present technology.

FIGS. 1A and 1B schematically show the structure of a tunnel segment 1 for use in the present interactive system. On FIG. 1A, the tunnel segment 1 is depicted in a sectional view perpendicular to a direction of travel of vehicles 27 on the racetrack 3. FIG. 1B shows the tunnel segment in a sectional view along the direction of travel.

The tunnel segment 1 comprises a roof 2 in the shape of a truncated hollow pyramid, terminating at its lower end on a pair of vertical side walls 4 disposed on both sides of the racetrack 3 or road surface. The roof 2 has openings 5 in its side faces perpendicular to the direction of travel on the racetrack 3. At least one projector 6 is installed in the upper area of the roof 2. The at least one projector 6 is centrally installed in the roof 2 at an installing device 7, for example a crossbar. A projection surface 8 of the projector 6 may illuminate the entire length of the racetrack 3 beneath the roof 2. Alternatively, a plurality of projectors 6 may be provided, a projection surface of each projector 6 covering a respective partial area of the road surface of the racetrack 3 beneath the roof 2, the projection surfaces 8 of the projectors 6 being contiguous or overlapping in a direction of travel of the vehicles 27 on the road surface of the racetrack 3. The projection surface 8 of a given projector 6 may protrude from at least one of the openings 5 so as to project onto a part of the racetrack 3 in front of and/or behind the roof 2 where the given projector 6 is mounted. The projectors 6 may for example be ultra high-definition (UHD) projectors. The projectors 6 may be connected to a central controller (FIG. 10), for example a computer, with data wires, for example with optical guides.

Virtual elements 30 (FIG. 8) of the present interactive system may be limited to a partial area of the projection surface 8, wherein multiple virtual elements 30 may be depicted in one projection surface 8. At least one virtual element 30 is disposed in the overlapping area of two projection surfaces 8 of adjacent projectors 6, wherein each projector 6 depicts the virtual element 30 so to avoid shadowing of virtual elements 30 by vehicles 27 and drivers. In an embodiment, the racetrack 3 may be disposed inside an illuminated hall or run at least partially outdoors, the virtual elements 30 being depicted at a partial area of the racetrack 3, the partial area of the racetrack 3 being constructed as a tunnel, surrounding light in the partial area being less intense than in the illuminated hall or outdoors.

Figure 2:
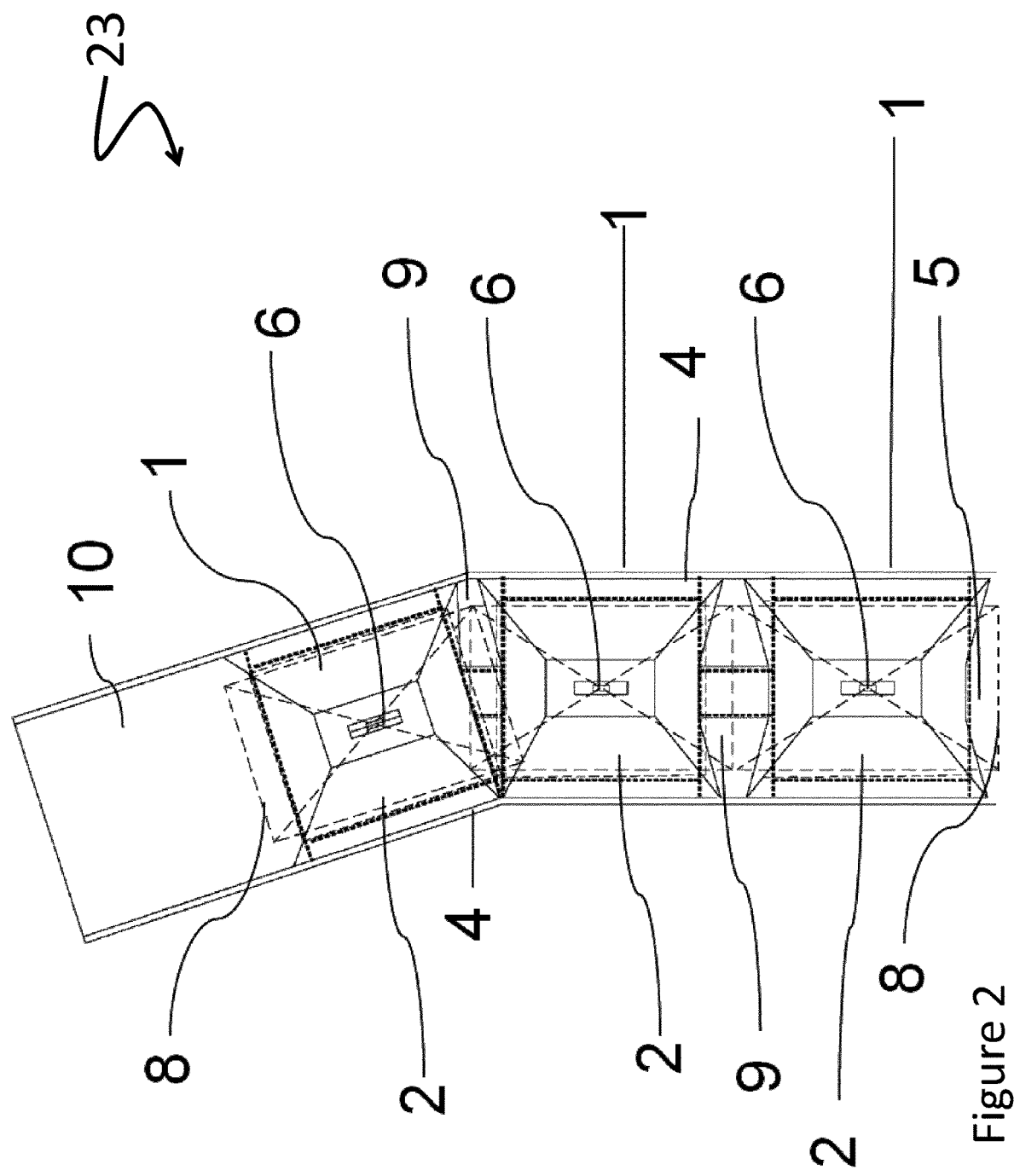
FIG. 2 is a top view of a tunnel including multiple tunnel elements of FIG. 1A in accordance with an embodiment of the present technology.

FIG. 2 shows an example of a tunnel 23 composed of multiple tunnel segments 1. Transition pieces 9 may be disposed between the tunnel segments 1, for example one transition piece 9 being disposed between each pair of adjacent tunnel segments 1 so to form a continuous tunnel 23. As illustrated in FIG. 2, some of the tunnel segments 1 may have substantially identical layouts, each substantially identical tunnel segment 1 comprising a plurality of substantially identical roofs 2, for example with rectangular layouts. The tunnel segments 1 may be present with substantially identical dimensions.

As illustrated, the transition pieces 9 may be present in different manifestations. In areas of curves or knees of the racetrack 3, transition pieces 9 with substantially arcuate, triangular or cuneiform layouts may be employed. In the area of straight sections of the racetrack 3, transition pieces 9 with substantially rectangular layouts may be employed.

The transition pieces 9 connect the openings 5 of pairs of adjacent tunnel segments 1. Each of the transition pieces 9 thus each a transition ceiling 12 (FIG. 4) between neighbouring roofs 2.

The transition pieces 9 may also have side walls similar to the side walls 4 of the tunnel segments 1. Alternatively, a part of the side walls 4 of the tunnel segments 1 may extend in the area of the transition pieces 9 so that, for each pair of adjacent tunnel segments 1, on each side of the road surface, a corresponding side of a transition piece 9 disposed between the pair of adjacent tunnel segments 1 connects one side wall 4 of the adjacent tunnel segment 1 to one side wall of another adjacent tunnel segment 1.

An awning 10 may be provided to cover a partial area of the racetrack 3. One awning 10 may be mounted to the opening 5 of the first tunnel segment 1, at an entrance of the tunnel 23, and another awning may be mounted to the opening 5 of the last tunnel segment 1, at an exit of the tunnel 23. These awnings 10, when present, may attenuate incident light in the first and/or last tunnel segments 1 of the tunnel 23.

As illustrated in FIG. 2, the projection surfaces 8 of neighbouring projectors 6 may be seamlessly contiguous or even overlap. In the area of the curve or knee of the racetrack 3, the projection surfaces 8 of the two projectors 6 are shown to overlap.

Figure 3:
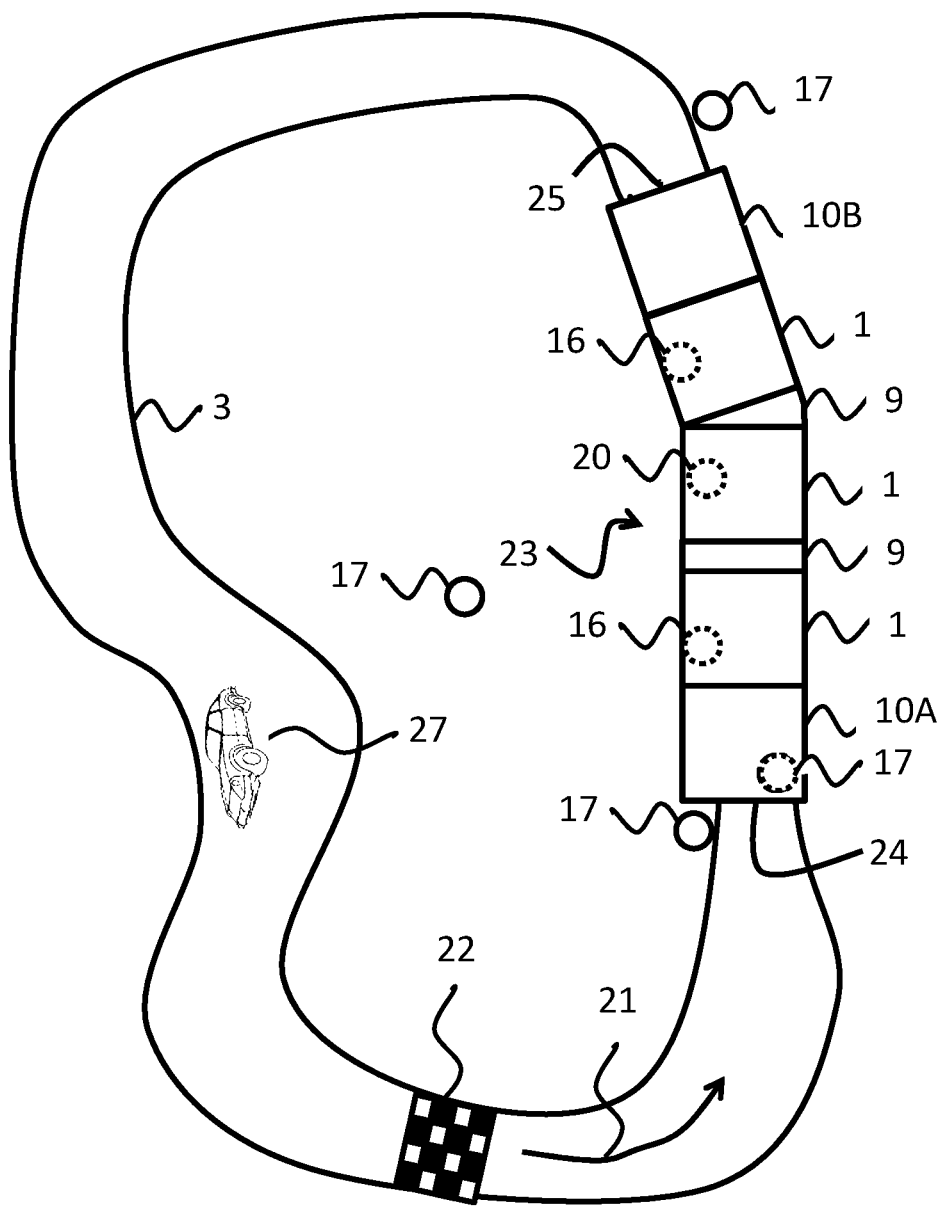
FIG. 3 is a top view of a racetrack which is covered in part by a tunnel of FIG. 2.

As shown on FIG. 3, vehicles 27 may circulate on the racetrack 3 in a direction of travel 21 from a start/finish line 22, passing through the tunnel 23 at each turn on the racetrack 3. They reach an entrance 24 of the tunnel 23 via a first awning 10A and then reach an exit 25 of the tunnel 23 after a second awning 10B, having traveled beneath a number of tunnel segments 1 connected by transition pieces 9. Constructing the tunnel 23 with more or fewer tunnel segments 1, without or without the awnings 10A and/or 10B, is contemplated. In an embodiment, two or more tunnels 23 may be disposed on the racetrack 3.

Figure 4:
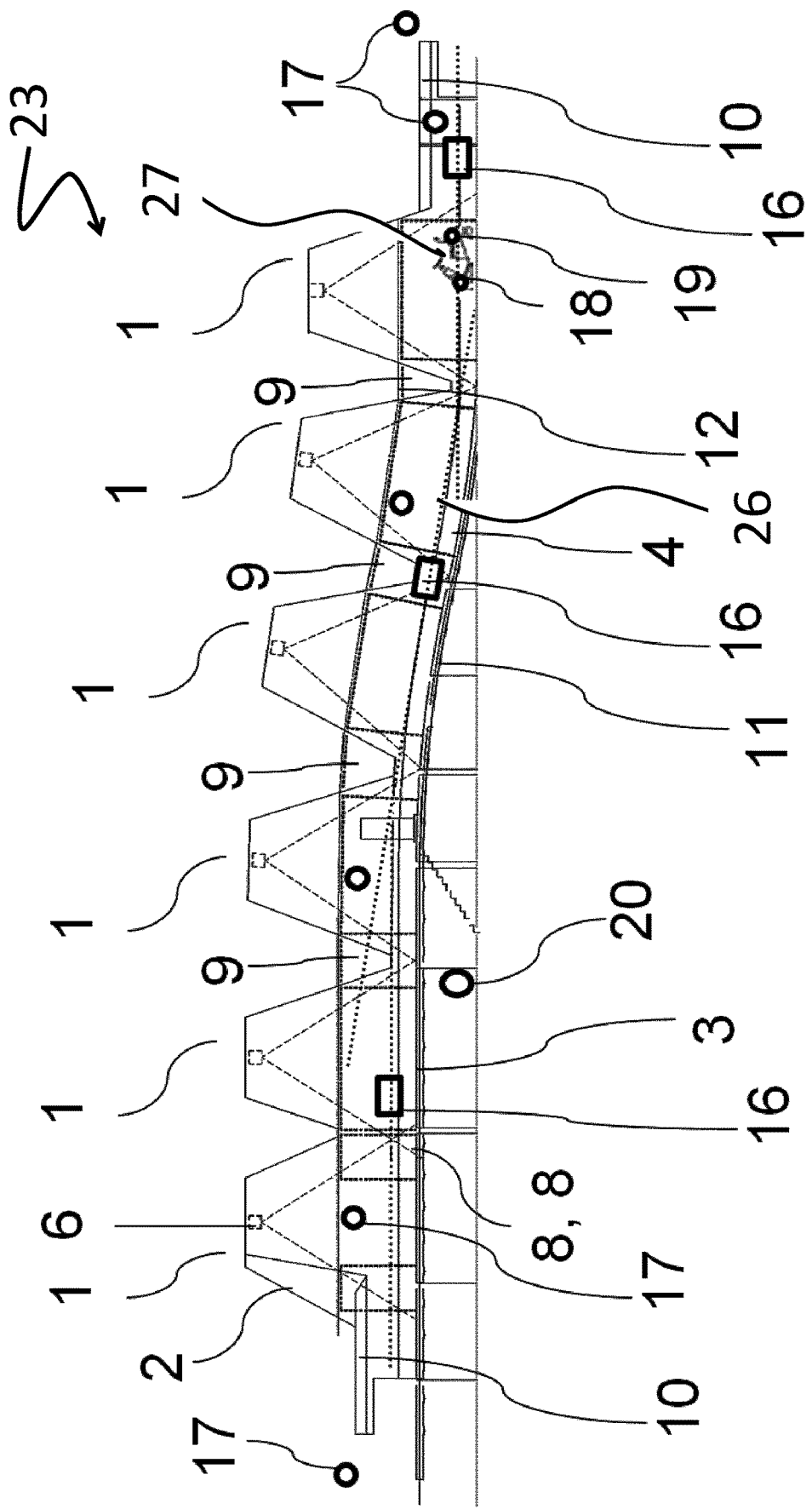
FIG. 4 is a side view of the tunnel of FIG. 2 in accordance with an embodiment of the present technology.

FIG. 4 illustrates an example of the tunnel 23 in a side view. On FIG. 4, the direction of travel of vehicles 27 in the tunnel 23 is from the right hand side of the illustration toward the left hand side of the illustration. The tunnel 23 matches a ramp 11 of the road surface that, as illustrated, has an upward slope 26 leading from a first level of the road surface of the racetrack 3 (on the right hand side of FIG. 4) up to a second, higher level of the road surface of the racetrack 3 (on the left hand side of FIG. 4). Various upward slopes realised between the tunnel segments 1 may be compensated by the various shapes of the transition pieces 9.

A partial area of the racetrack 3, which is located in the tunnel 23, is formed as a display surface for the virtual elements 30 by the contiguous projection surfaces 8 of the projectors 6. One or more of these virtual elements 30 may be displayed on the upward slope 26 of the racetrack 3.

A ceiling 12 of the tunnel is formed by tops of the awnings 10 and tops of the transition pieces 9. As depicted, the tunnel ceiling 12 may be designed at different heights in the area of the awnings 10 and in the area of the transition pieces 9. The roofs 2 of the tunnel segments 1 may protrude above a level of the ceiling 12.

In a non-limiting embodiment, a vertical distance of the projectors 6 from the racetrack 3 is at least 4 to 6 meters. In the same or another non-limiting embodiment, a vertical distance of the tunnel ceiling 12 from the racetrack 3 is between 2 meters and 3.5 meters. The projectors 6 may therefore be mounted above the level of the tunnel ceiling 12.

By disposing the projectors 6 in roofs 2 which protrude above the level of the ceiling 12, each projector 6 may cover a larger area of the racetrack 3 than if they were mounted at the level of the ceiling 12.

Openings and/or ventilation grilles may be present in the roofs 2 above the projectors 6, for example in upper cover surfaces of the roofs 2.

The tunnel 23 may be entered from its lower end, before the upward slope 26, as in this case an angle of view onto the projection surfaces 8 presents itself in the area of the ramp 11 when entering.

Figure 5:
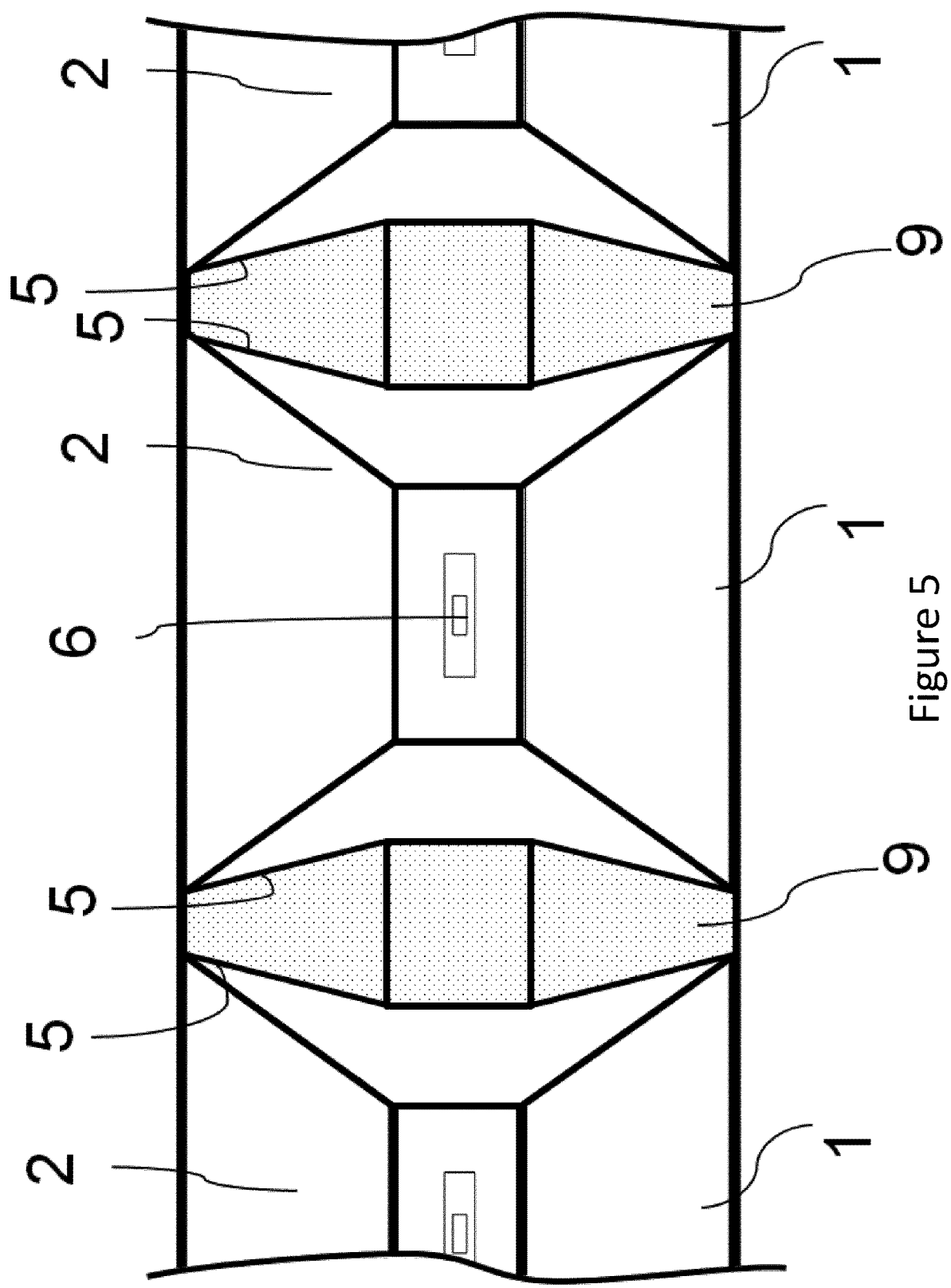
FIG. 5 is a schematic top view of the structure of a modular tunnel in accordance with an embodiment of the present technology.

FIG. 5 schematically shows an example embodiment of the roofs 2 and the transition pieces 9. The roofs 2 may be designed in the shape of truncated hollow pyramids, wherein their upper faces may be closed or open. The roofs 2 have openings 5 on opposite side faces. Inclined opening surfaces of the openings 5 result from the cut-outs in the trapezoidal side faces. The side faces of contiguous segments 1 facing each other may be connected by a transition piece 9.

The transition pieces 9 connect the peripheries of the openings 5. The transition pieces may be larger in size at their upper end than at their lower end in the direction of travel on the racetrack 3 to compensate for the diagonally rising opening flanks of the openings 5. The transition pieces 9 may comprise merely the upper surfaces depicted and the two diagonally rising side faces. Alternatively, the transition pieces 9 may also comprise part of the side wall 4.

Figure 6:
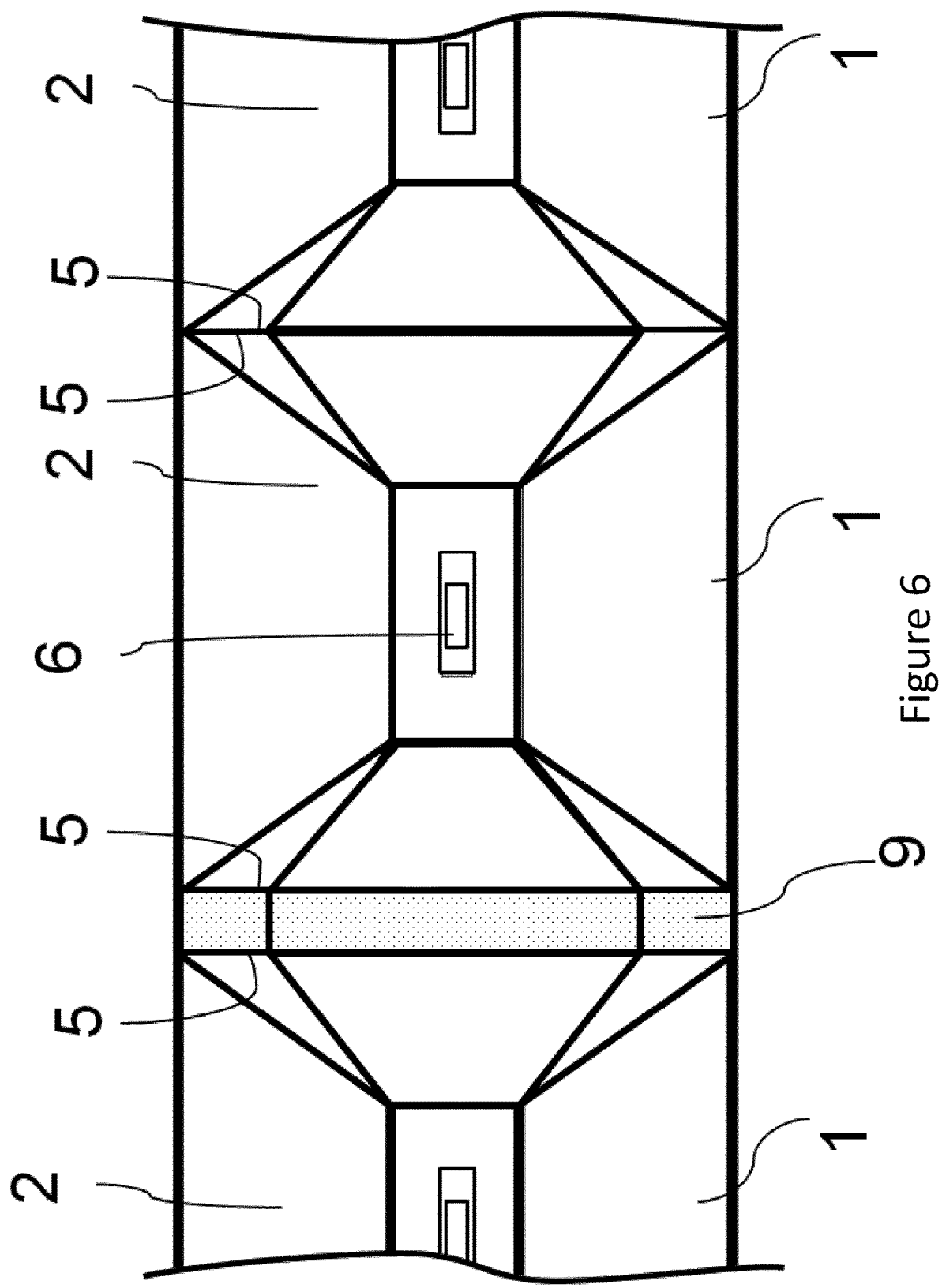
FIG. 6 is a schematic top view of the structure of a variant of the modular tunnel of FIG. 5 in accordance with an embodiment of the present technology.

As depicted in FIG. 6, in another variant embodiment, the roofs 2 may be designed with vertical opening surfaces of the openings 5. This may be achieved by the side face of the roof 2, at which the opening 5 is present, being composed of multiple partial faces. In this case, two roofs 2 may also be placed in a directly contiguous manner without a transition piece 9, if they are present at the same upward slope at a common straight section of the racetrack 3.

Figure 7:
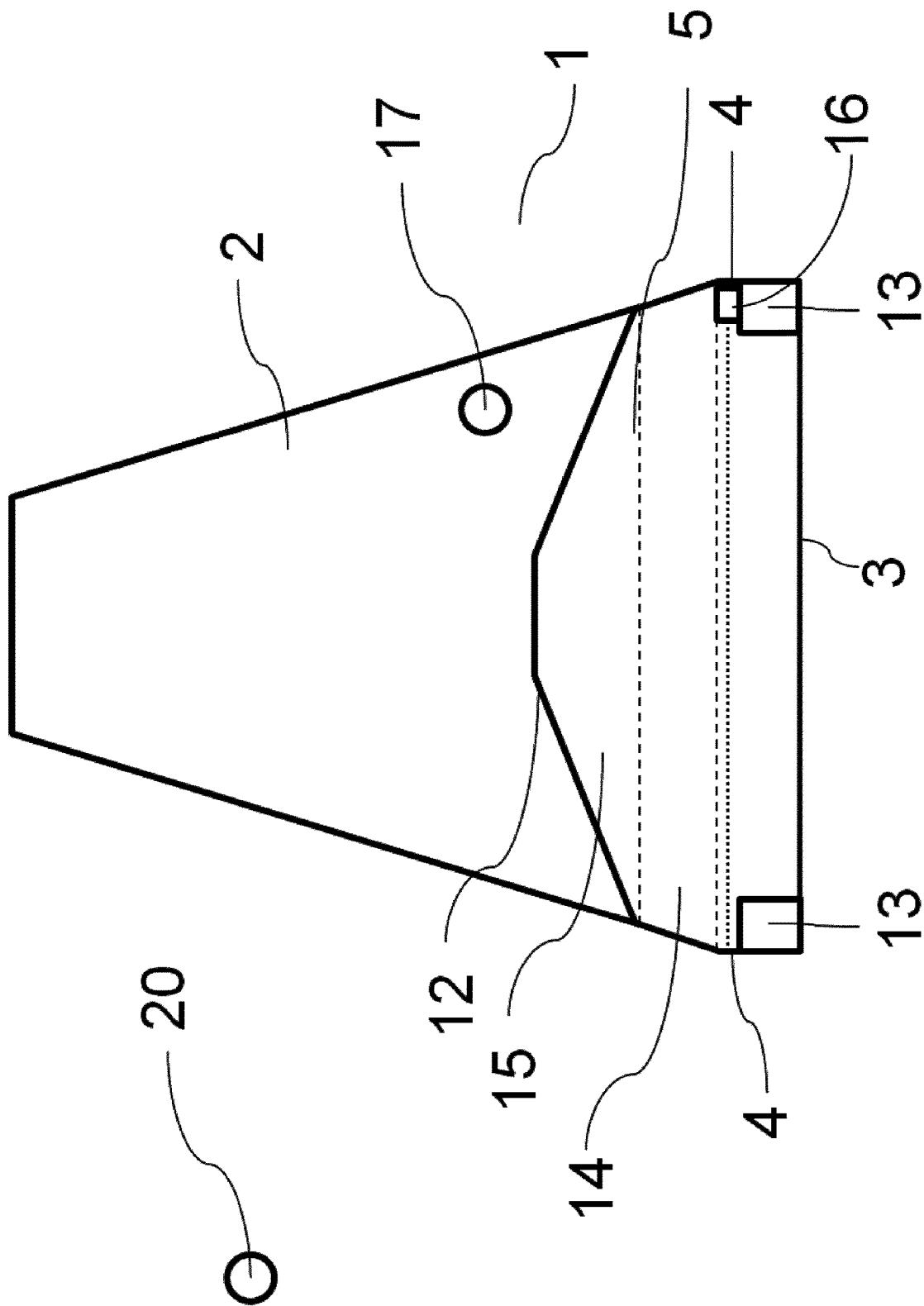
FIG. 7 is a schematic front view of the modular tunnel of FIG. 5 or 6.

FIG. 7 schematically illustrates a tunnel segment 1 in a front elevation view. The roof 2 has an opening 5 at its side face perpendicular to the direction of travel. The side faces longitudinally relative to the road surface rest on side walls 4. Bumper elements 13 capable of cushioning an impact may be provided along the side walls 4. The entrance opening of the tunnel segment 1 extends from the road surface up to the lower edge of the roof 2 via the side walls 4, and then over a partial area 14 of the side face perpendicular to the direction of travel, for example over the entire width of the side face perpendicular to the direction of travel. As depicted, a trapezoidal opening 15 in the side face perpendicular to the direction of travel may be present at the upper end of the partial area 14, occupying only a partial area of the side face perpendicular to the direction of travel. Instead of the trapezoidal opening 15, a triangular, polygonal, circular or ovoid opening may be provided.

Omitting the trapezoidal opening 15 in its entirety, so that the upper edge of the partial area 14, depicted in dashed lines, forms the ceiling 12 is also contemplated.

Optionally, the opening 5 in the roof 2 may be omitted altogether when designing the side walls 4 higher.

While the segmented structure of the tunnel 23 described along with the figures allows achieving a modular structure for different racetrack routes, it should be understood that other tunnels may be used for the present technology.

Figure 8:
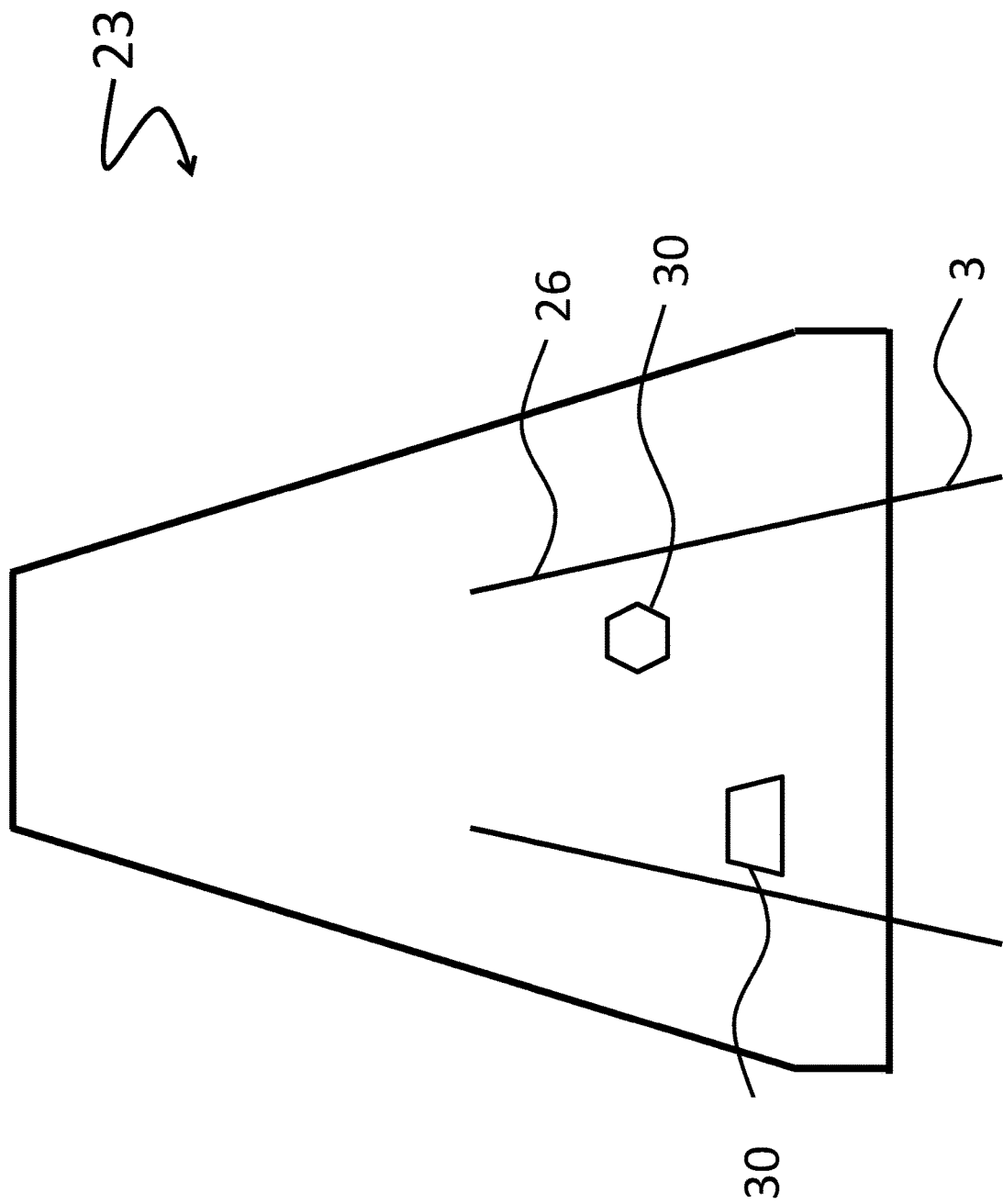
FIG. 8 is an illustration of virtual elements being displayed within the tunnel.

FIG. 8 shows only one of a myriad of possible examples of virtual elements 30 that may be displayed within the tunnel 23. In the illustrated example, the driver of a vehicle 27 entering the tunnel 23 on the racetrack 3 may see on the upward slope 26 of the ramp 11 a trapezoidal virtual element 30 designed to emulate a podium, so that driving over this element may cause the central controller 200 to allocate a temporary performance boost to the vehicle 27. Driving over an octagonal virtual element 30 designed to emulate a stop sign may cause the central controller 200 to temporarily reduce the performance of the vehicle 27. There is no limit to the number of types of the virtual elements 30 displayed within the tunnel 23. In an embodiment, these virtual elements 30 may change with time, for example based on a position, on speed and/or identity of a vehicle 27 entering the tunnel 23, or depending on a theme selected by an operator of the racetrack 3. Referring back to FIG. 4, the virtual element or elements may be displayed in the area of the upward slope 26 of the ramp 11.

In a non-limiting embodiment, openings formed by the tunnel segments 1 may be provided in the ceiling 12, and projectors 6 may be mounted in the tunnel segments 1 above the level of the ceiling 12, for example, to make an existing tunnel 23 suitable for the present interactive system. The virtual elements 30 may also be depicted at a non-roofed area of the racetrack 3.

Instead of projecting the virtual element 30 onto the road surface using conventional projectors, the virtual element 30 may be depicted as a hologram above the road surface using a hologram projector.

In the following, an embodiment of position detection systems 17 fixedly disposed at the racetrack 3, in the tunnel 23, is described with reference to FIGS. 3, 4 and 7. The position detection systems 17 are adapted to perform position detection of the vehicles 27. The position of the vehicles 27 is derived from transit time differences of signals from transmitters mounted on the vehicles 27 and received at stationary receivers of a plurality of position detection systems 17. In more details, a position detection system 17 may comprise a LIDAR (Light Detection and Ranging) apparatus 16 mounted in the tunnel 23 or in at least one tunnel segment 1. The LIDAR apparatus 16 may emit a laser beam, which is pivoted or rotated in a plane, being for example parallel to the road surface, and receives reflections of the laser beam, from the time of flight of which the presence of and distance from objects may be determined. Multiple LIDAR apparatuses may be mounted in the tunnel 23, for example 3 or 4 LIDAR apparatuses 16 in some embodiments. The tunnel 23 may extend over two levels, wherein one LIDAR apparatus 16 is disposed on each level, for example and without limitation in the area of the ramp 11. Apart from the LIDAR apparatus 16, the various position detection systems 17 may comprise one or more of distance sensors, rangefinders, photoelectric barrier measuring systems, light curtain measuring systems, and laser time-of-flight measuring systems.

In an embodiment, the position detection systems 17 may comprise at least one UWB (ultra wideband) receiver mounted in the tunnel 23 or in at least one tunnel segment 1. A transmitter 18, for example a UWB transmitter, may be mounted on each vehicle 27 and emit signals detectable by the position detection systems 17. Multiple UWB receivers may be mounted in the tunnel 23, so that the signal of one UWB transmitter at the vehicle 27 is receivable by three UWB receivers in each position in the tunnel 23. Alternatively or in addition, more UWB receivers may be mounted along the entire racetrack 3. For example, additional UWB receivers may be mounted along the racetrack 3, so that the signal of a UWB transmitter at the vehicle 27 is receivable by the additional UWB receivers in any position along the racetrack 3.

In an embodiment, at least one tunnel segment 1 may comprise a LIDAR system 16 and at least one UWB receiver. For example, at least one tunnel segment 1 may comprises one receiver of the first position detection system 17 and at least one second position detection system 17 located proximally to the area where the at least one virtual at least one virtual element 30 is depicted.

In addition, the racetrack may comprise a data transfer system. The data transfer system may comprise a fixed wireless communication apparatus 20 transmitting information to a wireless communication apparatus 19 disposed at the vehicle 27. The wireless communication apparatuses 19 and 20 may for example be WLAN (wireless local area network) communication apparatuses. The transmission range of the fixed wireless communication apparatus 20 may cover at least the entire tunnel 23 in one embodiment, or the entire racetrack 3 in another embodiment, so that vehicles 27 on the racetrack 3 receive data only from the fixed wireless communication apparatus 20.

The fixed wireless communication apparatus 20 may be placed at a central point within a circular racetrack 3.

Figure 9:
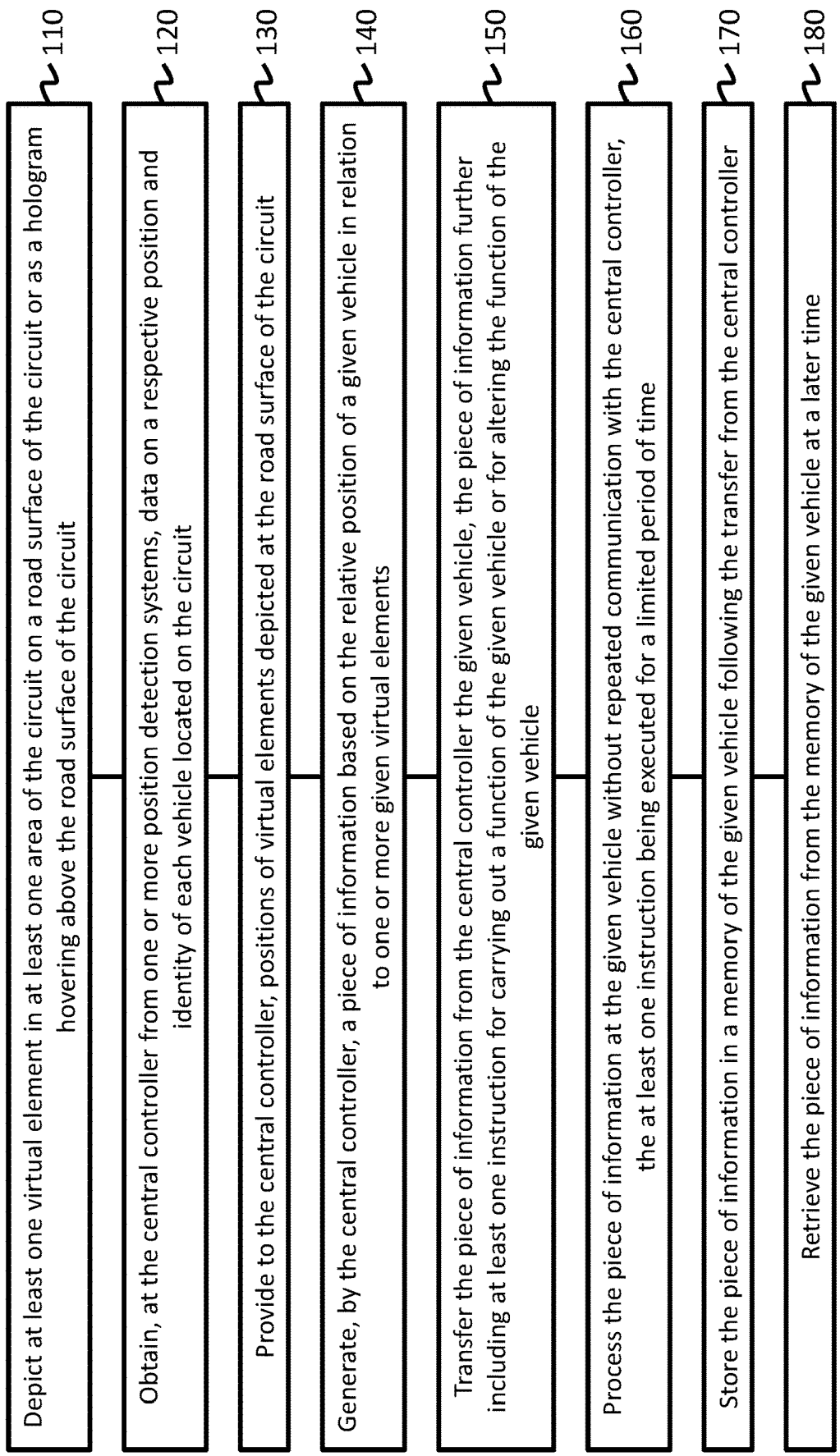
FIG. 9 is a sequence diagram showing operations of a method for data transfer in an interactive system for a track for human-driven vehicles in accordance with an embodiment of the present technology.

FIG. 9 is a sequence diagram showing operations of a method for data transfer, from a central controller to human driver vehicles 27 located on a racetrack 3, for example on a racetrack. On FIG. 9, a sequence 100 comprises a plurality of operations, some of which may be executed in variable order, some of the operations possibly being executed concurrently, some of the operations being optional.

At operation 110, at least one virtual element 30 is depicted in at least one area of the racetrack 3 on a road surface of the racetrack 3 or as a hologram hovering above the road surface of the racetrack 3. The central controller obtains, from one or more position detection systems 17, data on a respective position and identity of each vehicle 27 located on the racetrack 3 at operation 120. At operation 130, positions of virtual elements 30 depicted at the road surface of the racetrack 3 are provided to the central controller. The central controller generates, at operation 140, a piece of information based on the relative position of a given vehicle 27 in relation to one or more given virtual elements 30. The central controller may select a particular virtual element 30 based on the position, on a speed and/or on the identity of the given vehicle 27. The piece of information is transferred from the central controller the given vehicle 27 at operation 150. In addition to the relative position of the given vehicle 27 in relation to the one or more given virtual elements 30, the piece of information may further include at least one instruction for carrying out a function of the given vehicle 27 or for altering the function of the given vehicle 27. Data transfer between the vehicles 27 and the central controller may be performed via a single fixed WLAN transceiver unit at the racetrack 3, the single fixed WLAN transceiver unit communicating with the vehicles 27 located on the racetrack 3.

At operation 160, the given vehicle 27 may process the piece of information without repeated communication with the central controller, the at least one instruction being executed for a limited period of time. Following the transfer from the central controller, the piece of information may be stored in a memory of the given vehicle 27 at operation 170. The piece of information may be retrieved from the memory of the given vehicle 27 at a later time, at operation 180. For example and without limitation, the piece of information may be retrieved from the memory of the given vehicle 27 based on an operation performed by a driver of the given vehicle 27.

Figure 10:
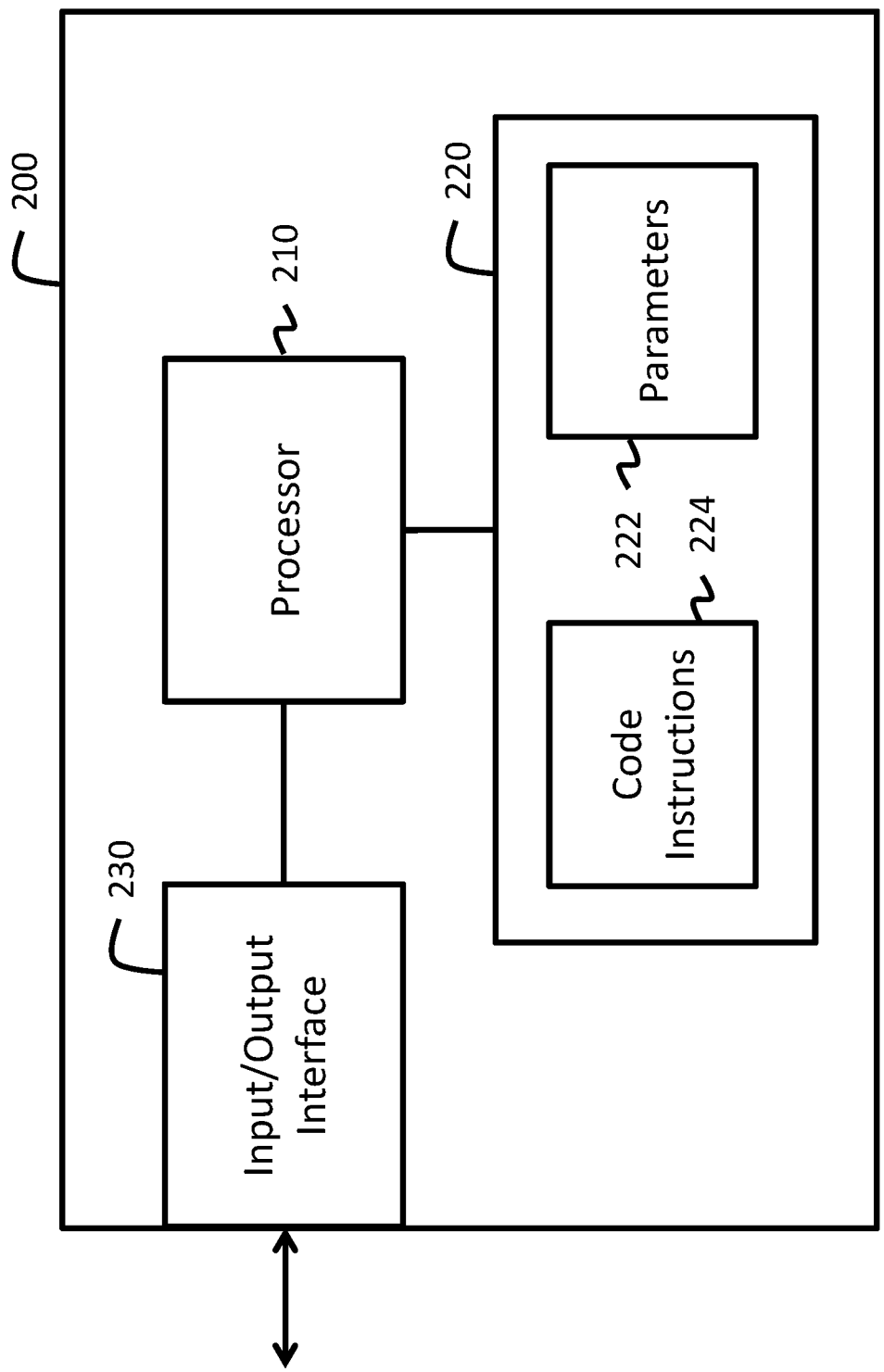
FIG. 10 is a block diagram of a central controller of the interactive system of FIG. 9 in accordance with an embodiment of the present technology.

Each of the operations of the sequence 100 attributed to the central controller may be configured to be processed by one or more processors, the one or more processors being coupled to one or more memory devices. FIG. 10 illustrates an embodiment of a central controller 200. The central controller 200 comprises a processor or a plurality of cooperating processors (represented as a processor 210 for simplicity), a memory device or a plurality of memory devices (represented as a memory device 220 for simplicity), an input/output device or a plurality of input/output devices (represented as an input/output device 230 for simplicity). Separate input devices and output devices (not shown) may be present instead of the input/output device 230. The processor 210 is operatively connected to the memory device 220 and to the input/output device 230. The memory device 220 may include a storage 222 for storing parameters, including for example information related to the at least one virtual element 30 and its location along the racetrack, information about the position detection systems 17, the position of each vehicle 27 located on the racetrack, and the like. The memory device 220 may also comprise a non-transitory computer-readable medium 224 for storing instructions that are executable by the processor 210, for example to allow the processor to execute or cause to execute operations 110, 120, 130, 140 and 150 of the sequence 100. The input/output device 230 may be connected by wire or wirelessly to the position detection systems 17, the projectors 6, the UWB receivers, and to the communication apparatuses 19 and 20.

Various embodiments of the present technology may be contemplated, as expressed in the following paragraphs.

In an embodiment, the central controller 200 transmits data to the vehicles 27 via a data transfer system independent of the position detection systems 17. Thus, in an embodiment, at least first and second position detection systems 17 and a data transfer system may be disposed at the racetrack 3. The data transfer system may comprise a WLAN system, for example operating over a Wireless Fidelity (WIFI) connection.

In an embodiment, at least one of the position detection systems 17 also allows identification of the vehicles 27. This may be done by each vehicle 27 having a unique distinctive feature, which may be detectable or receivable by at least one of the position detection systems 17. In an embodiment, the unique distinctive feature may be a digital value, which may be transmitted from the vehicle 27 to the position detection systems 17 once or repeatedly. In another embodiment, the unique distinction feature may be a unique physical feature of a vehicle 27. Since the digital value may be transmitted from the vehicle 27 to the position detection system 17, no direct communication is required between the vehicle 27 and the central controller 200 for position detection. In an embodiment, the vehicle 27 does not receive any data from the position detection system 17.

In an embodiment, position detection by the first position detection system 17 may be continuous and complete over the entire racetrack 3. In an embodiment, position detection by the first position detection system 17 may also be in the area of the second position detection system 17, so that the position may be detected by the first and second position detection systems 17 in the area of the at least one virtual element 30.

Optionally, position detection may be solely performed by the second position detection system 17, disposed in proximity to a partial area of the racetrack 3 where the at least one virtual element 30 is depicted. In another option, position detection of the vehicles 27 may be performed solely by the second position detection system 17 in the area proximate to at least one virtual element 30. In an embodiment, the positions of the vehicles 27 may be continuously sensed by overlapping detection areas of the first and second position detection systems 17.

In an embodiment, position detection and identification of the vehicles 27 on the entire racetrack 3 may be performed based on a first position detection system 17, a second position detection system 17 being provided to allow more precise position determination than the first position detection system 17 in the area of the virtual elements 30. This embodiment allows the first position detection system 17 to perform position detection and identification of the vehicles 27, providing first position data for each vehicle 27, while the second position detection system 17 determines the position of the vehicles 27, since it is known from the first position detection system 17 which vehicle(s) 27 may be currently arriving or located in the area of the second position detection system 17. The second position detection system 17 may therefore only perform the position determination of objects, but not their identification. By this measure, photoelectric barriers, laser time-of-flight measuring systems or LIDAR systems may be used in the second position detection system 17, which allow to precisely and quickly determine the position of objects, without the need to consider their identification, in particular if they are objects with uniform dimensions. For example, a distance measuring apparatus, for example in the form of a laser time-of-flight measuring system being directed to the racetrack 3, may be disposed in the area in front of at least one virtual element 30 on the side of the racetrack 3. Using a, signal from the distance measuring apparatus, once an object is sensed, the position of an object in the direction of travel of the racetrack 3 and its distance from the distance measuring apparatus is a direction perpendicular to the racetrack 3 may be established, providing second position data for each vehicle 27. The relative position of the object with respect to a virtual element 30 depicted at the racetrack 3 may be precisely derived from those two position data. If such distance measuring apparatuses are disposed on both sides of the racetrack 3, the positions of two vehicles 27, which may be present in the measuring area of the distance measuring apparatus at the same time, may also be derived. By using a LIDAR system, which may be located in an elevated position, the positions of all vehicles 27 present in the measuring area of the LIDAR system may be determined.

In an embodiment, multiple two-dimensional LIDAR systems, which sense the presence and position of objects in a two-dimensional plane, may be mounted in the area of the virtual elements 30.

As described above, it may not be necessary for the second position detection system 17 to perform identification of the vehicles 27, if this has already been done by the first position detection system 17. The second position detection system 17, however, may additionally perform the identification of the vehicles 27. In an embodiment, identification of the vehicles 27 by the second position detection system 17 may be based on unique distinctive features of the vehicles 27 different from those used when the first position detection system 17 is used. For example, the LIDAR system may identify the vehicles 27 based on a physical object mounted on the vehicle 27, the physical object having an individual geometry and/or a specific position on the vehicle 27.

Optionally, identification of the vehicles 27 may also be obtained via the second position detection system 17, via a further, third position detection system 17, or via an additional identification system. For example, identification of the vehicles 27 may be done when they are started or each time they cross the start/finish line 22, in particular the starting line, wherein the respective identification may be assigned to that vehicle 27. The position at which the vehicles 27 are started or their positions when passing the start/finish line 22 coincides with the position of a vehicle 27 derived by the first position detection system 17. If the first position detection system 17 continuously senses the position of the vehicles 27 identified at least once over the entire racetrack 3, repeated identification may not be necessary.

Identification may also be exclusively or additionally be done by the second position detection system 17, wherein the identification may be assigned to that vehicle 27 the positions of which derived by the first and second position detection systems 17 coincide or correlate the most.

In an embodiment, the first and second position detection systems 17 detect signals from transmitters 18 mounted on the vehicles 27, which transmit an electromagnetic signal, in the form of an omnidirectional radio signal, and a plurality of receivers distributed over space around the racetrack 3, which receive the radio signals, wherein the position detection and identification of the individual vehicles 27 may be done by each signal of the transmitters 18 being assigned a unique identifier and a piece of time information and the positions of the individual vehicles 27 may be derived via the time-of-flight differences of the signals received by the receivers of the first and second position detection systems 17. By triangulation, trilateration or any other known mathematical method of signal processing, the three-dimensional position of a vehicle 27 in space or the two-dimensional position of the vehicle 27 on the racetrack 3 may be calculated from the time-of-flight differences of the signal of its transmitter to different receivers. In an embodiment, the first position detection allows the position to be determined within a mean accuracy of less than 25 centimeters.

In an embodiment, the second position detection system 17 comprises at least one laser time-of-flight measuring system, which may be able to detect the precise spatial, or two-dimensional, position and orientation of a vehicle 27 on the racetrack 3 by time-of-flight determination of a laser beam reflected by the vehicle 27. In an embodiment, the second position detection system 17 allows position detection within a mean accuracy of less than 10 centimeters, for example less than 5 centimeters.

In an embodiment, the position detection systems 17 may operate entirely without the use of cameras, so that potential personal data protection issues may be avoided. In such a case, no position determination is performed at the vehicle 27 itself, so that the data exchange between the vehicle 27 and the central controller 200 may be kept at a minimum.

For enhancing the visibility of virtual elements 30 at the racetrack 3, in an embodiment, the virtual elements 30 may be depicted at the upward slope 26 formed, for example on the ramp 11 which leads from a first level of the racetrack 3 up to a second, higher, level of the racetrack 3.

The virtual elements 30 may be two-dimensional projections onto the road surface or three-dimensional projections in which a virtual, three-dimensional object, or hologram, appears above the road surface.

In an embodiment, the racetrack 3 may be constructed in a well-lit environment, with the virtual elements 30 being provided in a partial, less illuminated area of the racetrack 3, this area being constructed, for example, as a tunnel 23 comprising a plurality of tunnel segments 1 and optionally comprising the additional awnings 10.

In an embodiment, the virtual elements 30 may be depicted in the tunnel 23 forming a roofed area of the racetrack 3, on its road surface, wherein the racetrack 3 takes and the upward slope 26 in the roofed area, wherein the position sensing and identification of the vehicles 27 on the racetrack 3 may be performed by a first position detection system 17 and the position sensing of vehicles 27 in the roofed area where the virtual elements 30 are depicted may be performed by a second, more accurate position detection system 17.

In an embodiment, the virtual elements 30 may be influenced by the central controller 200 based on the position detection of the vehicles 27.

In an embodiment, the vehicles 27 may be influenced by the central controller 200 based on their position with respect to the virtual elements 30. For example, passing over a virtual element 30 may trigger a control protocol of the central controller 200 which influences the travelling behaviour of the vehicle 27.

In an embodiment, projectors 6 each projecting an image onto the road surface or a hologram inside of the tunnel 23 may be disposed in the tunnel 23 or in the roofed area of the racetrack 3. Optionally, the road surface may be used as a screen, for example, by having one or more display surfaces disposed behind one or more glass panels.

In an embodiment, a tunnel segment 1 may comprise at least one roof 2 that may be conical or frustoconical or in the shape of a pyramid, which may be truncated. A projector 6 may be mounted in an upper end area of the at least one roof 2 for projecting an image onto the surface of the racetrack 3. In another embodiment, the tunnel segments 1 that form the tunnel 23 may comprise at least two roofs 2 for mounting at least two projectors 6.

In an embodiment, the images of the projectors 6 may be contiguous or overlap in order to create the illusion of a single continuous projection. In an embodiment, the roofs 2 that may be frustoconical or in the shape of a truncated pyramid may be adjoined by closed walls, which connect the roofs 2 to the floor or the ramp 11. Optionally, the walls may also serve as projection surfaces 8. To this end, projectors 6 may be disposed in the inclined surfaces of the roofs 2 or on opposite walls, or screens may be disposed on the walls.

By this design, a partial area of the otherwise lit racetrack 3 may be partially dimmed with respect to the surrounding light around the racetrack 3 outside of the tunnel 23 to make the virtual element 30 well visible in this area. Sufficient light intensity to allow driving is still provided in the tunnel 23 due to the illumination of the road surface by the projectors 6 and optionally the walls of the awnings 10 or of the tunnel segments 1.

In an embodiment, the upward slope 26 in the tunnel 23 provides a better view of the virtual elements 30 projected along this slope. External light that may be visible at each end of the tunnel 23, which might impair the visibility of the virtual elements 30, is at least in part hidden from view of the drivers when they enter the tunnel 23 and at least until they reach the end of the upward slope 26.

The central controller 200 may control the virtual elements 30 and processes the position information of the position detection systems 17. The central controller 200 may transmit instructions to actuators of the vehicles 27 and/or information to a data memory of the vehicles 27.

In an embodiment, the wireless communication apparatuses 19 mounted on the vehicles 27 may communicate with the central controller 200 via the fixed wireless communication apparatus 20 using WLAN or another wireless technology. In an embodiment, only one transceiver unit of the fixed wireless communication apparatus 20 may be present over the entire racetrack 3 so that the vehicles 27, sometimes travelling at high speed, communicate with a single transceiver unit. A handover of communication from one transceiver unit to the next may thus be omitted.

In an embodiment, the transmission range of the transceiver unit may comprise the entire racetrack 3. In another variant embodiment, the transmission range of the transceiver unit may comprise the area of the virtual elements 30, in particular the part of the racetrack 3 which is present in the tunnel 23, beneath the tunnel segments 1 and/or the awnings 10, where the virtual elements 30 may be depicted.

Communication between the vehicles 27 and the central controller 200 may occur over the entire racetrack 3 or only in the area of the virtual elements 30. Communication may be unidirectional from the central controller 200 to the vehicles 27 or bidirectional. Unidirectional communication provides that the vehicles 27 do not need to have transmitters for communicating with the central controller 200.

In an embodiment, instructions to actuators of the vehicles 27 may be generated by the central controller 200 depending on the relative positions of the vehicles 27 with respect to virtual elements 30.

In an embodiment, instructions to actuators of the vehicles 27 may be generated by the central controller 200 depending on the relative positions of the vehicles 27 with respect to the delimitations of the racetrack 3.

In an embodiment, instructions to actuators of the vehicles 27 may be generated by the central controller 200 depending on previously calculated movement trajectories of the vehicles 27.

In an embodiment, instructions to actuators of the vehicles 27 may be generated by the central controller 200 depending on the relative positions of vehicles 27 with respect to one another.

In an embodiment, a piece of information which makes a function of a vehicle 27 retrievable by the driver of the vehicle 27 may be transmitted to a data memory of the vehicle 27 by the central controller 200 based on the relative position of the vehicle 27 with respect to a virtual element 30. A function or impact of the virtual element 30 on the performance of the vehicle 27 may thus result from an interaction of the vehicle 27 with the virtual element 30. No repeated communication between the central controller 200 and the vehicle 27 is needed for this effect to take place.

In an embodiment, multiple areas with virtual elements 30 may be disposed along the racetrack 3, wherein one of multiple second position detections is provided in each of the areas.

In an embodiment, each vehicle 27 may have a WLAN module, wherein actuators and optionally sensors of the vehicle 27 may be attached via a bus system, in particular a controller area network (CAN) bus.

In an embodiment, each vehicle 27 may comprise at least one electric motor with power electronics for a drive of the vehicle 27. In an embodiment, the power of the vehicle 27 may be influenced by the central controller 200 or by information received from the central controller 200 and stored in the data memory of the vehicle 27, in view of altering the parameters of power electronics of the electric motor. In an embodiment, the central controller 200 or information from the data memory may dictate altered parameters of the power electronics and a time period for which the altered parameters may be to be applied. Thereby, by one-time communication or data transfer with the central controller 200, an effect on the vehicle 27 may be maintained or made available for a certain time period without repeated communication and/or feedback by the vehicle 27 being necessary.

In an embodiment, the first position detection system 17 may use UWB position determination technology. An indoor position detection system 17 using UWB has an accuracy of about 10 to 30 centimetres and low latency, capable of allowing position sensing up to 100 times per second. In UWB technology, position determination is based on a time-of-flight (ToF) method. In the method, the signal propagation time between an object and multiple receivers may be measured. For example and without limitation, three or more receivers may be used to accurately localise an object using trilateration.

In an embodiment, each vehicle 27 may have a transmitter, in particular an UWB transmitter, while multiple UWB receivers may be disposed along the racetrack 3. In an embodiment, directional receivers which sense signals from a direction with limited angular range may be present as well as receivers which sense signals from a wide angular range, for example, omnidirectional receivers detecting all signals frontally impinging upon the sensor surface in a 360° range. In an embodiment, receivers may be disposed along the entire racetrack 3. In an embodiment, the receivers may have a distance with respect to one another of, for example 3 to 15 meters or 5 to 12 meters, in a direction of travel of the vehicles 27 on the racetrack 3. In an embodiment, the receivers may be disposed at a height of 1 to 5 meters or at a height of 1.4 to 3 meters above the road surface. In an embodiment, at least twenty receivers, or up to thirty or forty receivers, may be disposed along the racetrack 3.

In an embodiment, a further position detection system may determine a lap time of the vehicles 27, the further position detection system using, for example, an induction loop underneath the road surface of the racetrack 3.

In an embodiment, multiple loudspeakers may be installed in the tunnel 23. In an embodiment, at least six or eight loudspeakers may be installed in the tunnel 23. In an embodiment, each tunnel segment 1, each awning 10 and/or each transition element 9 may have at least two loudspeakers, which may be present on opposite sides of the tunnel walls. The loudspeakers may also be present independently of the tunnel segments 1. Thus, any number of loudspeakers may be mounted in any locations of the tunnel 23 or of the racetrack 3.

In an embodiment, the position determination of the vehicles 27 may be used to control or adjust the rendition of sounds and noises from the loudspeakers. In an embodiment, the signals may be altered by the data of the position detection systems 17 at multiple loudspeakers such that the sounds and/or noises follow the respective vehicles 27 along the racetrack 3 from one loudspeaker or pair of loudspeakers to the next.

In an embodiment, a signal to the loudspeakers may be generated for each vehicle 27, wherein the signal is provided to different mutually spaced-apart loudspeakers with different levels, wherein the level of the signal is altered depending on the distance between the respective loudspeaker and the respective vehicle 27.

In one variant embodiment, control of the loudspeakers may be based on the position, status and/or current appearance of at least one virtual element 30. In an embodiment, an alteration of the depiction of a virtual element 30 may be made based on the detected relative position of a vehicle 27 with respect to the virtual element 30, and rendition by at least one loudspeaker may be initiated at the same time or as a result of the alteration. However, control of the loudspeaker may also be independent of the position of the vehicles 27 and/or the position of the virtual elements 30.

In an embodiment, a virtual route with dimensions smaller than the width of the racetrack 3 may be depicted on the road surface, wherein the position of the vehicle 27 is derived relative to the virtual route, and data may be generated and transferred to the vehicle 27 based on the derived relative position.

In an embodiment, virtual elements 30 may be depicted on the road surface, wherein the position of the vehicle 27 is determined relative to the virtual elements 30, and data may be generated and transferred to the vehicle 27 based on the derived relative position. In an embodiment, alternatively or additionally, the depiction of at least one virtual element 30 may be altered based on the derived relative position, for a limited period of time, after which the virtual element 30 may be reset to its original condition. In an embodiment, alternatively or additionally, the rendition or level of rendition of loudspeakers may be altered based on the derived relative position.

In an embodiment, the position of virtual elements 30 may be altered based on the derived position of a vehicle, so that virtual elements 30 may be moved towards or away from a vehicle 27.

In an embodiment, the respective vehicle 27 may be assigned a unique identifier for the driver of the vehicle 27. In an embodiment, the driver-vehicle 27 combination may be assigned a configuration, which affects the vehicle 27 performance. For example, the performance of the vehicle 27 may be adapted to the weight, experience and/or previously achieved times per lap of the driver. The vehicle 27 performance may be altered depending on the lap time or number of laps travelled. In an embodiment, this may be used to allow inexperienced drivers a familiarisation period in the beginning. In an embodiment, vehicle 27 drivers may be weighed prior to the drive and their weight may be stored. In an embodiment, drivers may be each assigned a vehicle, or a driver may be assigned to each vehicle, prior to the drive. In an embodiment, the performance of the respective vehicle 27 may be adapted to the stored weight of the respective driver.

In an embodiment, the vehicle 27 performance may also be altered depending on the relative positions of the vehicles 27 with respect to one another.

In an embodiment, the performances of vehicles 27 to be overtaken may be reduced when an overtaking vehicle 27 approaches to facilitate the overtaking. This may prevent line formation behind slower drivers.

In an embodiment, the following measures may be taken automatically or by manually handling the central controller 200:
reducing the maximum speed of at least one vehicle, for example in the case of unsafe behaviour,
stopping one or more vehicles 27,
assigning a driver to a different vehicle 27 if a vehicle 27 fails or needs to be exchanged for any other reason,
rendering warnings and reducing the speed of the vehicles 27.

Warnings for the drivers of the vehicles 27 may be issued by display elements at the vehicle 27 and/or by display elements at the racetrack 3. Alternatively or additionally, warnings may be rendered via loudspeakers at the vehicle 27 and/or at the racetrack 3. For example, light signals may be disposed along the racetrack 3 and/or at the vehicles 27. A warning may be issued by switching light sources on, changing their colours and/or causing the light sources to flash. Warnings may also be depicted visually on display surfaces or as text, for example on display surfaces at the racetrack 3 or remote from the racetrack 3, for example allow team members of the driver of a vehicle 27 located in a team room outside of the racetrack 3 to have an interaction with the vehicle 27 and its driver, for example for providing a team boost to the vehicle 27.

In an embodiment, the vehicle 27 performance or maximum speed may be affected depending on the absolute positions of the vehicles 27 on the racetrack 3, for example to create zones with speed limits for the racetrack 3.

In an embodiment, the vehicle 27 performance or maximum speed may be increased or reduced, for example gradually, depending on the lap time or on a number of laps.

In an embodiment, it may be gathered from the data of the position detection system 17 when a vehicle 27 comes to a standstill or travels very slowly or in the wrong direction. In such a case, in an embodiment, the performance or speed of the vehicle 27 concerned and/or of following vehicles 27 approaching this may be affected.

In an embodiment, the current positions of all vehicles 27 on the racetrack 3 may be sensed and rendered on at least one display apparatus. In an embodiment, lap times and/or racing positions and/or maximum speeds may be also sensed and rendered on at least one display apparatus. In an embodiment, individual one or more such pieces of information may be used to generate or alter virtual elements 30 depending thereon.

In an embodiment, additional display devices may be disposed along the racetrack 3 in order to make information, for example the above-mentioned information, available to the drivers. In an embodiment, a display device may be disposed next to or above the start/finish line 22 of the racetrack 3. In an embodiment, a display device may be disposed at the entrance 24 of the tunnel 23 in order to be able to depict information on a game mode that controls a kind of virtual elements 30 depicted in the tunnel 23 and that controls events resulting from interactions between the vehicle 27 and the virtual elements 30.

In an embodiment, the vehicles 27 may communicate with the central controller 200 to activate or deactivate control elements and/or motor power of the vehicles 27.

In an embodiment, the vehicles 27 may communicate with a central controller 200 to provide a controllable, time-limited performance boost.

In an embodiment, input means such as for example pushbuttons, may be made available to the drivers to retrieve time-limited performance boosts of the vehicle 27. In an embodiment, the input means also have an output means such as for example a status LED, which displays an availability status for the performance boosts. In an embodiment, when all performance boosts have been used, further retrieval of the performance boost may only be available after a definable time span, which may be depicted for the driver by suitable display elements. In an embodiment, the number of available performance boosts may increase per lap or per race, this number being definable by the central controller 200 and be stored in a memory of the vehicle 27.

In an embodiment, the WIFI connection between the vehicles 27 and the central controller 200 may be deactivated at a given vehicle 27, so that the given vehicle 27 no longer receives any control commands, for example, by deactivating the WIFI receiver at the vehicle 27. Thereby, for example, a vehicle 27 which is operated by racetrack 3 staff may be excluded from global control commands of the central controller 200.

In an embodiment, at least one of multiple vehicles 27 may transmit in time intervals a status report including vehicle settings, including for example performance settings, to the central controller 200. In an embodiment, the vehicle settings may be compared to the vehicle settings pre-set for the vehicle 27 by the central controller 200, and in case of deviation, new vehicle settings may be transmitted to the vehicle 27. This may ensure that false or outdated vehicle settings of the vehicle 27 may be corrected in the case of communication errors.

In case no status reports are received from one or more vehicles 27 over a period of multiple transfer cycles, an error or warning signal may be issued to report that the concerned vehicles 27 are not receiving any data to the central controller 200. Alternatively or in addition, it may be established that a vehicle 27 is unable to receive data of the central controller 200 when it does transmit status reports but fails to react to instructions transmitted by the central controller 200.

In an embodiment, the central controller 200 may also cyclically transmit data and/or vehicle settings to the vehicles 27.

If a vehicle 27 does not receive any data or vehicle settings over multiple cycles, the vehicle 27 may be operated with the last received vehicle settings, or the vehicle settings may be set to basic or contingency vehicle settings stored in the vehicle 27.

The basic vehicle settings may be loaded or set automatically at each start-up of the vehicle 27.

In general, human-driven vehicles 27, including motor vehicles 27 such as, for example, automobiles, motorbikes, bumper cars, minibikes, e-scooters, snowmobiles, or e-bikes, may be suitable for use with the present interactive system. Further, muscle-powered vehicles 27, for example bicycles, may be used with the present interactive system. In an embodiment, the driver may be located on or in the vehicle 27. Remote control of the vehicle 27 by a driver is also possible.

The racetrack 3 may form a closed circuit, so that one and the same vehicle 27 may repeatedly pass the at least one virtual element 30 and the second position detection system 17.

The racetrack 3 may be partially or completely disposed outdoors.

In an embodiment, the racetrack 3 may be completely disposed in a hall.

In an embodiment, the interactive system comprises a tunnel 23, which may further comprise transition pieces 9 positioned between tunnel segments 1 as well as an entry awning 10 and/or an exit awning 10, the tunnel 23 overhanging above a road surface. Multiple projectors 6 may be mounted in the tunnel segments 1, wherein the projectors 6 may be mounted spaced apart in succession in the direction of travel of vehicles 27 in the tunnel 23. The projectors 6 may be mounted in a higher position in relation to the ceiling 12 formed by the transition pieces 9 and/or by the awnings 10. Projection surfaces 8 of the projectors 6 may be seamlessly contiguous or overlap on the road surface, including in a portion of the road surface beneath the awnings 10, in the direction of travel thereof.

In an embodiment, the width of the projection surface 8 of the respective projector 6 on the road surface may extend over at least 80%, or over at least 90%, of the width of the road surface.

In an embodiment, the width of the projection surface 8 of the respective projector 6 on the road surface may be at least equal to the width of the road surface.

In an embodiment, the length of the respective projection surface 8 in the direction of travel of the road surface may be greater than the width of the respective projection surface 8.

In an embodiment, a roof 2 may be disposed in each tunnel segments 1 that form adjoining openings in the ceiling 12 formed by the transition pieces and/or by the awnings, wherein the projector 6 may be mounted in the upper area of the roof 2.

In an embodiment, the roofs 2 may be present as segments, which may be connected by interposing transition pieces, wherein the ceiling 12 may be formed by the transition pieces 9 and by the awnings 10, inner surfaces of the roofs 2 forming the openings in the ceiling 12.

In an embodiment, the projectors 6 may be present above the openings 5 at a vertical distance of at least 0.5 meter, in particular a distance of at least one meter from the openings 5.

The interactive system may further comprise a tunnel 23, wherein the tunnel 23 may be composed of at least two tunnel segments 1, a projector 6 being mounted in each of the segments, wherein the projector 6 projects an image onto a road surface within the tunnel 23, wherein the projection surfaces 8 of successive projectors 6 may at least partially overlap and wherein at least three receivers of the first position detection system 17, which receive a signal of a transmitter disposed at a vehicle 27 and derive therefrom the position of the vehicle 27 in the tunnel 23, may be disposed in the tunnel 23 and a second position detection system 17 may be disposed in at least one tunnel segment 1, which system comprises at least one transmitter and one receiver and derives the distance of the vehicle 27 to the transmitter and/or the receiver by time-of-flight measurement of an optical signal reflected by the vehicle 27 and received at the receiver, wherein the position data obtained by the first and second position detection systems 17 may be transmitted to a central controller 200, which may alter the position and/or appearance of at least one virtual element 30 depicted in the projection surfaces 8 based on the position data of at least one vehicle 27.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A tunnel mounted above a road surface, the tunnel comprising:
   a ceiling;
   a plurality of tunnel segments, each tunnel segment comprising a roof adjacent to a respective opening formed in the ceiling by the tunnel segment, the openings of the plurality of tunnel segments being spaced apart in succession in a direction of travel of vehicles in the tunnel; and
   a plurality of projectors, each projector being adapted for displaying at least one virtual element onto the road surface within the tunnel, at least one projector of the plurality of projectors being mounted in each of the tunnel segments above the respective opening formed in the ceiling by each tunnel segment;
   wherein the tunnel segments are disposed so that projection surfaces of the projectors are seamlessly contiguous or overlapping on the road surface in the direction of travel.

2. The tunnel of claim 1, wherein:
   the tunnel segments are adapted for mounting the projectors in upper areas of the roofs.

3. The tunnel of claim 2, further comprising one or more transition pieces;
   wherein:
   one transition piece is disposed between each pair of adjacent tunnel segments;
   the roofs of the tunnel segments are connected by interposing the transition pieces therebetween; and
   the ceiling of the tunnel is formed at least in part by the transition pieces.

4. The tunnel of claim 1, wherein:
   the opening of each tunnel segment is formed at a lower end of the roof and
   the tunnel segments are adapted for mounting the projectors above the openings at a vertical distance of at least 0.5 meter from the lower end of the roof.

5. The tunnel of claim 4, wherein the tunnel segments are adapted for mounting the projectors above the openings at a vertical distance of at least one meter, from the lower end of the roof.

6. The tunnel of claim 1, further comprising at least one transition piece;
   wherein:
   the roof of each tunnel segment terminates at its lower end on a pair of vertical side walls disposed on opposite sides of the road surface;
   for each pair of adjacent tunnel segments, on each side of the road surface, a corresponding side of one transition piece of the at least one transition piece being disposed between the pair of adjacent tunnel segments connects one side wall of one of the adjacent tunnel segments to one side wall of another one of the adjacent tunnel segments;
   the at least one transition piece forms part of the ceiling of the tunnel; and
   the roofs of the tunnel segments protrude above the ceiling of the tunnel.

7. The tunnel of claim 1, wherein:
   the plurality of tunnel segments comprises a plurality of identical tunnel segments having rectangular layouts; and
   the roofs of the identical tunnel segments are identical roofs, each identical roof being adapted for mounting at least one projector therein.

8. The tunnel of claim 1, further comprising one or more transition pieces, one transition piece connecting each pair of adjacent tunnel segments, the one or more transition pieces being adapted for compensating for various slopes or angles between the pairs of adjacent tunnel segments.

9. The tunnel of claim 1, wherein an entrance of the tunnel is at a first level and an exit of the tunnel is at a second level higher than the first level, whereby the tunnel matches an upward slope on the road surface beneath the tunnel.

10. The tunnel of claim 1, further comprising a first position detection system disposed in the tunnel, the first position detection system comprising three first receivers adapted for receiving a signal of a transmitter mounted on a vehicle passing in the tunnel, the first position detection system being adapted for deriving a first position data for the vehicle in the tunnel based on the signal received at the three first receivers.

11. The tunnel of claim 10, further comprising a second position detection system comprising a transmitter and a second receiver, the transmitter being adapted for transmitting an optical signal toward the vehicle, the second receiver being adapted for receiving a reflection of the optical signal reflected by the vehicle, the second position system being further adapted for deriving second position data for the vehicle, the second position data comprising a distance between the vehicle and the transmitter and/or a distance between the vehicle and the second receiver, the second position data being derived by time-of-flight measurement of the optical signal and of the reflected optical signal.

12. The tunnel of claim 1, further comprising:
    a first awning positioned at a start of the tunnel; and
    a second awning positioned at an end of the tunnel;
    wherein:
    the ceiling is formed at least in part by the first and second awnings;
    the first awning is mounted to a first one, in the direction of travel, of the plurality of tunnel segments; and
    the second awning is mounted to a last one, in the direction of travel, of the plurality of tunnel segments.

13. The tunnel of claim 12, wherein:
    the projection surface of at least one of the projectors extends onto a portion of the road surface of the track located beneath the first awning; and
    the projection surface of at least another one of the projectors extends onto a portion of the road surface of the track located beneath the second awning.

14. A tunnel mounted above a road surface, the tunnel comprising:
    a plurality of tunnel segments;
    a plurality of projectors, at least one projector of the plurality of projectors being mounted in each of the tunnel segments, the projectors being adapted for displaying at least one virtual element onto the road surface within the tunnel, wherein projection surfaces of successive projectors are seamlessly contiguous or at least partially overlap on the road surface within the tunnel;
a first position detection system disposed in the tunnel, the first position detection system comprising three first receivers adapted for receiving a signal from a transmitter mounted on a vehicle passing in the tunnel, the first position detection system being adapted for deriving first position data for the vehicle in the tunnel based on the signal received at the at least three first receivers; and
a second position detection system comprising a transmitter and a second receiver, the transmitter being adapted for transmitting an optical signal toward the vehicle, the second receiver being adapted for receiving a reflection of the optical signal reflected by the vehicle, the second position system being further adapted for deriving second position data for the vehicle, the second position data comprising a distance between the vehicle and the transmitter and/or a distance between the vehicle and the second receiver, the second position data being derived by time-of-flight measurement of the optical signal and of the reflected optical signal; and
a central controller being in communication with the first and second position detection systems, the central controller being adapted for receiving the first and second position data for the vehicle from the first and second position detection systems and to alter at least one of a position and an appearance of the at least one virtual element displayed onto the road surface based on the first and second position data for the vehicle.

15. The tunnel of claim 14, wherein each projector is mounted in a respective tunnel segments above a respective opening formed by the respective tunnel segment in a ceiling of the tunnel, the openings of successive tunnel segments being spaced apart in succession in a direction of travel of vehicles in the tunnel.

* * * * *

UNITED STATES PATENT AND TRADEMARK OFFICE
CERTIFICATE OF CORRECTION

| | | |
|---|---|---|
| PATENT NO. | : 11,969,661 B2 | |
| APPLICATION NO. | : 17/621892 | |
| DATED | : April 30, 2024 | |
| INVENTOR(S) | : Christopher Lindinger et al. | |

It is certified that error appears in the above-identified patent and that said Letters Patent is hereby corrected as shown below:

In the Claims

In Column 21, Line 49, Claim 4, "end of the roof and" should read --end of the roof; and--

Signed and Sealed this
Thirteenth Day of August, 2024

Katherine Kelly Vidal
*Director of the United States Patent and Trademark Office*